(12) United States Patent
Xu et al.

(10) Patent No.: US 12,494,870 B2
(45) Date of Patent: Dec. 9, 2025

(54) COMMUNICATION METHOD AND APPARATUS

(71) Applicant: HUAWEI TECHNOLOGIES CO., LTD., Guangdong (CN)

(72) Inventors: Xiaoying Xu, Shenzhen (CN); Huiying Zhu, Shanghai (CN); Pengpeng Dong, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/390,854

(22) Filed: Dec. 20, 2023

(65) Prior Publication Data

US 2024/0129068 A1 Apr. 18, 2024

Related U.S. Application Data

(63) Continuation of application No. PCT/CN2022/100329, filed on Jun. 22, 2022.

(30) Foreign Application Priority Data

Jun. 28, 2021 (CN) .......................... 202110720693.1

(51) Int. Cl.
*H04L 1/1812* (2023.01)
*H04W 28/06* (2009.01)

(52) U.S. Cl.
CPC ........... *H04L 1/1819* (2013.01); *H04W 28/06* (2013.01)

(58) Field of Classification Search
CPC ........... H04L 1/1819; H04L 2001/0096; H04L 1/0041; H04L 1/1887; H04L 1/1896;
(Continued)

(56) References Cited

U.S. PATENT DOCUMENTS

2004/0153909 A1\* 8/2004 Lim ...................... H04L 1/0009
714/714
2004/0223478 A1\* 11/2004 Fischer ................. H04L 1/1607
370/349
(Continued)

OTHER PUBLICATIONS

Lucani et al. "Network Coding Schemes for Underwater Networks: the benefits of implicit acknowledgement". Jan. 2007. (Year: 2007).\*
(Continued)

*Primary Examiner* — Steve N Nguyen
(74) *Attorney, Agent, or Firm* — Rimon PC

(57) ABSTRACT

This application provides a communication method and apparatus, where a first radio link control (RLC) entity is introduced to transmit a network-coded redundant packet, and a second RLC entity is introduced to transmit a network-coded original packet, to support requirement-based transmission of the network-coded redundant packet. In some embodiments, an apparatus receives scheduling information from an access network device. The apparatus obtains a network-coded redundant packet through a first RLC entity, generates a first transport block (TB) based on the network-coded redundant packet, and sends the first TB to the access network device, where the first TB includes the network-coded redundant packet. The first RLC entity is configured to transmit the network-coded redundant packet. In this way, the access network device schedules the network-coded redundant packet by using the scheduling information only when the network-coded redundant packet needs to be scheduled, avoiding resource waste by reducing unnecessary and redundant transmission.

20 Claims, 9 Drawing Sheets

(58) Field of Classification Search
CPC .... H04L 1/1829; H04L 1/1867; H04W 28/06; H04W 72/23
See application file for complete search history.

(56) References Cited

U.S. PATENT DOCUMENTS

| | | | | |
|---|---|---|---|---|
| 2009/0122746 | A1* | 5/2009 | Chang | H04L 5/0055 370/315 |
| 2015/0078275 | A1* | 3/2015 | Kim | H04W 72/23 370/329 |
| 2016/0205586 | A1* | 7/2016 | Kim | H04L 1/1835 370/230 |
| 2016/0278009 | A1* | 9/2016 | Sorrentino | H04L 1/1819 |
| 2017/0207895 | A1* | 7/2017 | Yang | H04W 72/23 |
| 2018/0199315 | A1* | 7/2018 | Hong | H04W 76/15 |
| 2019/0306906 | A1* | 10/2019 | Huang | H04W 76/34 |
| 2022/0376820 | A1* | 11/2022 | Sandberg | H03M 13/09 |

OTHER PUBLICATIONS

3GPP TS 23.501 V16.3.0 (Dec. 2019), "3rd Generation Partnership Project; Technical Specification Group Services and System Aspects; System architecture for the 5G System (5GS); Stage 2 (Release 16)," 409 total pages.

3GPP TS 38.300 V15.4.0 (Dec. 2018), "3rd Generation Partnership Project; Technical Specification Group Radio Access Network; NR; NR and NG-RAN Overall Description; Stage 2 (Release 15)," 97 total pages.

3GPP TS 38.413 V16.0.0 (Dec. 2019), "3rd Generation Partnership Project; Technical Specification Group Radio Access Network; NG-RAN; NG Application Protocol (NGAP) (Release 16)," 335 total pages.

3GPP TS 38.423 V16.0.0 (Dec. 2019), 3rd Generation Partnership Project; Technical Specification Group Radio Access Network; NG-RAN; Xn application protocol (XnAP) (Release 16), 330 total pages.

3GPP TS 38.473 V15.4.1 (Jan. 2019), "3rd Generation Partnership Project; Technical Specification Group Radio Access Network; NG-RAN; F1 application protocol (F1AP) (Release 15)," 192 total pages.

3GPP TS 38.463 V16.5.0 (Apr. 2021), "3rd Generation Partnership Project; Technical Specification Group Radio Access Network; NG-RAN; E1 Application Protocol (E1AP) (Release 16)," 237 total pages.

* cited by examiner

COMMUNICATION METHOD AND APPARATUS

CROSS REFERENCE TO RELATED APPLICATIONS

This application is a continuation of International Application No. PCT/CN2022/100329, filed on Jun. 22, 2022, which claims priority to Chinese Patent Application No. 202110720693.1, filed on Jun. 28, 2021. The disclosures of the aforementioned applications are hereby incorporated by reference in their entireties.

TECHNICAL FIELD

This application relates to the communication field, and more specifically, to a communication method and apparatus.

BACKGROUND

A network coding function may be implemented at a packet data convergence protocol (PDCP) layer. Network coding means that a group of data packets are encoded together, to obtain a network-coded original packet. This improves transmission reliability. A network-coded redundant packet may be further generated. The PDCP layer sends the network-coded original packet and the network-coded redundant packet to a radio link control (RLC) entity.

On an uplink, user equipment (UE) sends the network-coded original packet and the network-coded redundant packet to a base station. When the base station has received a sufficient quantity of network-coded packets, scheduling the network-coded redundant packet causes a waste of resources. On a downlink, the base station sends the network-coded original packet and the network-coded redundant packet to the UE. When the UE has received a sufficient quantity of network-coded packets, scheduling the network-coded redundant packet to the UE causes a waste of resources. Therefore, how to reduce unnecessary redundant transmission becomes an urgent problem to be resolved.

SUMMARY

In view of this, this application provides a communication method and apparatus. A first radio link control (RLC) entity is introduced to transmit a network-coded redundant packet, and a second RLC entity is introduced to transmit a network-coded original packet, so that requirement-based transmission of the network-coded redundant packet can be supported.

According to a first aspect, a communication method is provided. The method includes: A terminal device (or a chip in the terminal device) receives first scheduling information from an access network device, where the first scheduling information indicates that a first uplink grant resource is used to support sending of a network-coded redundant packet. Then, the terminal device obtains the network-coded redundant packet through a first RLC entity of the terminal device, and generates a first transport block (TB) based on the network-coded redundant packet. Finally, the terminal device sends the first TB to the access network device on the first uplink grant resource, where the first TB includes the network-coded redundant packet; and the first RLC entity is configured to transmit the network-coded redundant packet, the first RLC entity is independent of a second RLC entity, and the second RLC entity is configured to transmit a network-coded original packet.

In comparison with a conventional-technology solution in which one RLC entity sends a network-coded original packet and a network-coded redundant packet, in this embodiment of this application, the first RLC entity transmits the network-coded redundant packet, and the second RLC entity transmits the network-coded original packet, so that requirement-based transmission of the network-coded redundant packet can be implemented. In this way, transmission of the network-coded redundant packet is triggered when a quantity of successfully transmitted network-coded original packets is insufficient, thereby avoiding unnecessary redundant transmission and helping save resource overheads.

Optionally, the method further includes: The terminal device sends the initially transmitted network-coded original packet to the access network device on the first uplink grant resource. In other words, if there is still a network-coded original packet that is not transmitted, the terminal device may send, on the first uplink grant resource, the initially transmitted network-coded original packet to the access network device.

When scheduling the terminal device to send the network-coded packet, the access network device performs scheduling based on a priority of a logical channel, and preferentially schedules a network-coded original packet carried on a logical channel with a high sending priority. For example, a sending priority of a second logical channel associated with the second RLC entity is higher than a sending priority of a first logical channel associated with the first RLC entity, the first logical channel carries the network-coded redundant packet, and the second logical channel carries the network-coded original packet.

Before sending the network-coded redundant packet, the terminal device may first send the network-coded original packet to the access network device. Optionally, the method further includes: The terminal device receives second scheduling information from the access network device, where the second scheduling information indicates that a second uplink grant resource is used to send the network-coded original packet. The terminal device obtains the network-coded original packet through the second RLC entity, and generates a second transport block TB based on the network-coded original packet. The terminal device sends the second TB to the access network device on the second uplink grant resource.

The following describes an implementation in which the terminal device establishes the first RLC entity and the second RLC entity.

In an implementation, the terminal device receives a first configuration message of a radio bearer from the access network device, where the first configuration message includes configuration information of a first RLC bearer and configuration information of a second RLC bearer; and establishes the first RLC entity and the second RLC entity based on the first configuration message.

Therefore, the terminal device may establish the first RLC entity and the second RLC entity based on configuration of the access network device, to support requirement-based transmission of the network-coded redundant packet.

Optionally, the first configuration message further includes packet data convergence protocol (PDCP) configuration information, and the method further includes: The terminal device establishes a PDCP entity based on the PDCP configuration information. The PDCP entity sends the network-coded redundant packet to the first RLC entity. The PDCP entity sends the network-coded original packet to the second RLC entity.

In another implementation, the terminal device receives a second configuration message of a radio bearer from the access network device, where the second configuration message includes configuration information of a first radio link control RLC bearer, configuration information of a second RLC bearer, and PDCP configuration information, the PDCP configuration information includes a first proportion, and the first proportion is a ratio of a quantity of network-coded packets transmitted by the first RLC entity to a quantity of network-coded packets transmitted by the second RLC entity; and establishes the first RLC entity and the second RLC entity based on the second configuration message.

Therefore, a PDCP layer of the terminal device may split data to the first RLC entity and the second RLC entity based on the first proportion configured by the access network device.

According to a second aspect, a communication method is provided. The method includes: First, an access network device (or a chip in the access network device) sends first scheduling information to a terminal device, where the first scheduling information indicates that a first uplink grant resource is used to support sending of a network-coded redundant packet; and then receives a first TB from the terminal device, where the first TB includes the network-coded redundant packet, and the first TB is generated by a first RLC entity based on the network-coded redundant packet; and the first RLC entity is configured to transmit the network-coded redundant packet, the first RLC entity is independent of a second RLC entity, and the second RLC entity is configured to transmit a network-coded original packet.

In comparison with a conventional-technology solution in which one RLC entity sends a network-coded original packet and a network-coded redundant packet, in this embodiment of this application, the first RLC entity transmits the network-coded redundant packet, and the second RLC entity transmits the network-coded original packet, so that requirement-based transmission of the network-coded redundant packet can be implemented. In this way, transmission of the network-coded redundant packet is triggered when a quantity of successfully transmitted network-coded original packets is insufficient, thereby avoiding unnecessary redundant transmission and helping save resource overheads.

Optionally, the method further includes: The access network device receives the initially transmitted network-coded original packet from the terminal device.

Before scheduling the network-coded redundant packet, the access network device may first schedule the network-coded original packet. Optionally, the method further includes: The access network device sends second scheduling information to the terminal device, where the second scheduling information indicates that a second uplink grant resource is used to send the network-coded original packet; and receives a second TB from the terminal device, where the second TB is generated based on the network-coded original packet.

The access network device may configure the terminal device to establish the first RLC entity and the second RLC entity.

In an implementation, the access network device sends a first configuration message of a radio bearer to the terminal device, where the first configuration message includes configuration information of a first RLC bearer and configuration information of a second RLC bearer.

Optionally, the first configuration message further includes PDCP configuration information. The access network device may configure a PDCP entity of the terminal device to send the network-coded redundant packet to the first RLC entity, and send the network-coded original packet to the second RLC entity.

In another implementation, the access network device sends a second configuration message of a radio bearer to the terminal device, where the second configuration message includes configuration information of a first radio link control RLC bearer, configuration information of a second RLC bearer, and PDCP configuration information, the PDCP configuration information includes a first proportion, and the first proportion is a ratio of a quantity of network-coded packets transmitted by the first RLC entity to a quantity of network-coded packets transmitted by the second RLC entity.

It may be understood that the access network device may include a central unit (CU) and a distributed unit (DU), that is, the CU and the DU are separated.

In a scenario in which the CU and the DU are separated, the CU may determine a tunnel for transmitting the network-coded redundant packet.

In a possible implementation, optionally, the method further includes: The CU sends configuration information of an uplink tunnel to the DU, where the uplink tunnel includes a first tunnel and a second tunnel, the configuration information of the uplink tunnel includes a third indication, and the third indication indicates that the first tunnel is for transmission of the network-coded redundant packet. The CU receives configuration information of a downlink tunnel from the DU, where the configuration information of the downlink tunnel includes information corresponding to the first tunnel and information corresponding to the second tunnel.

Optionally, the configuration information of the uplink tunnel further includes a fourth indication, and the fourth indication indicates that the second tunnel is for transmission of the network-coded original packet.

In a scenario in which the CU and the DU are separated, the DU may determine a tunnel for transmitting the network-coded redundant packet.

In a possible implementation, optionally, the method further includes: The CU sends configuration information of an uplink tunnel to the DU, where the uplink tunnel includes a first tunnel and a second tunnel. The CU receives configuration information of a downlink tunnel from the DU, where the configuration information of the downlink tunnel includes a fifth indication, and the fifth indication indicates that the first tunnel is for transmission of the network-coded redundant packet.

Optionally, the configuration information of the downlink tunnel further includes a sixth indication, and the sixth indication indicates that the second tunnel is for transmission of the network-coded original packet.

In the first aspect and the second aspect, the first scheduling information may implicitly indicate or explicitly indicate that the first uplink grant resource is used to support sending of the network-coded redundant packet.

For example, the first scheduling information carries a first indication, and the first indication indicates that the first uplink grant resource is used to support sending of the network-coded redundant packet.

In the first aspect and the second aspect, the first uplink grant resource may not only be used to send the network-coded redundant packet, but also be used to send the network-coded original packet.

In the first aspect and the second aspect, the second scheduling information may implicitly indicate or explicitly indicate that the second uplink grant resource is used to send the network-coded original packet.

For example, the second scheduling information carries a second indication, and the second indication indicates that the second uplink grant resource is used to send the network-coded original packet.

It may be understood that the network-coded redundant packet is generated by performing network coding on the network-coded original packet.

According to a third aspect, a communication method is provided. The method includes: First, a terminal device (or a chip in the terminal device) receives first scheduling information from an access network device, where the first scheduling information indicates that a first downlink resource is used to support sending of a network-coded redundant packet. Then, the terminal device receives a first TB from the access network device, where a data packet obtained through parsing the first TB is processed by a first RLC entity of the terminal device, the data packet obtained through parsing the first TB is the network-coded redundant packet, and the network-coded redundant packet is used to restore an original packet corresponding to a part of network-coded original packets.

Before sending the network-coded redundant packet to the terminal device, the access network device may first send the network-coded original packet to the terminal device. Optionally, the method further includes: The terminal device receives second scheduling information from the access network device, where the second scheduling information indicates that a second downlink resource is used to send the network-coded original packet. The terminal device receives a second TB, where a data packet obtained through parsing the second TB is processed by a second RLC entity of the terminal device, and the data packet obtained through parsing the second TB is the network-coded original packet.

For the terminal device, after receiving the second TB sent by the access network device, the terminal device detects the second TB, and sends feedback information to the access network device based on a detection result of the second TB. In this way, the access network device may determine, based on the feedback information sent by the terminal device, whether to send the first TB.

The feedback information may be carried in physical layer signaling (for example, uplink control information carried on a physical uplink control channel (PUCCH)) or medium access control (MAC) layer signaling.

Before sending the feedback information, the terminal device may receive a configuration threshold from the access network device, and then determine, based on the configuration threshold, content included in the feedback information.

Optionally, the method further includes: The terminal device receives the configuration threshold from the access network device, where the configuration threshold is a threshold corresponding to one TB or a threshold corresponding to one group of TBs; and determines the feedback information based on the configuration threshold and the detection result of the second TB.

It may be understood that the configuration threshold may be carried in an existing message (for example, the configuration message of the radio bearer), or may be a newly defined message. This is not limited herein.

It may be further understood that the configuration threshold may be an error rate configuration threshold, or may be a success rate configuration threshold.

For example, the configuration threshold is the error rate configuration threshold. When an error rate of the second TB is greater than or equal to the error rate configuration threshold, the feedback information includes a negative acknowledgment (NACK), or includes a NACK and request information. When an error rate of the second TB is less than the error rate configuration threshold, the feedback information includes request information, or includes an acknowledgment (ACK) and request information.

According to a fourth aspect, a communication method is provided. The method includes: An access network device (or a chip in the access network device) sends first scheduling information to a terminal device, where the first scheduling information indicates that a first downlink resource is used to support sending of a network-coded redundant packet; and sends a first TB to the terminal device on the first downlink resource, where the first TB is generated by a first RLC entity based on the network-coded redundant packet, and the first TB includes the network-coded redundant packet; and the first RLC entity is configured to transmit the network-coded redundant packet, the first RLC entity is independent of a second RLC entity, and the second RLC entity is configured to transmit a network-coded original packet.

Before sending the network-coded redundant packet to the terminal device, the access network device may first send the network-coded original packet to the terminal device.

Optionally, the method further includes: The access network device sends second scheduling information to the terminal device, where the second scheduling information indicates that a second downlink resource is used to send the network-coded original packet; and sends a second TB to the access network device on the second downlink resource, where the second TB is generated by a second RLC entity based on the network-coded original packet, and the second TB includes the network-coded original packet.

In a possible implementation, the first TB may be sent by the access network device after the access network device receives feedback information from the terminal device.

Optionally, the method further includes: The access network device receives the feedback information from the terminal device, where the feedback information is used to request to transmit the network-coded redundant packet.

The access network device may send a configuration threshold to the terminal device in advance, so that the terminal device determines, based on the configuration threshold and a detection result of the second TB, content included in the feedback information.

Optionally, the method further includes: The access network device sends the configuration threshold to the terminal device, where the configuration threshold is a threshold corresponding to one TB or a threshold corresponding to one group of TBs.

For example, when the feedback information includes a NACK, or the feedback information includes a NACK and request information, the access network device sends the first TB to the terminal device. When the feedback information includes request information, or the feedback information includes an ACK and request information, the access network device sends the first TB to the terminal device.

In another possible implementation, the first TB may be actively sent by the access network device to the terminal device, that is, the access network device may determine when to send the network-coded redundant packet to the terminal device.

In the third aspect and the fourth aspect, the first scheduling information implicitly indicates or explicitly indicates that the first downlink resource is used to support sending of the network-coded redundant packet.

For example, the first scheduling information carries a first indication, and the first indication indicates that the first downlink resource is used to support sending of the network-coded redundant packet.

In the third aspect and the fourth aspect, the second scheduling information implicitly indicates or explicitly indicates that the second downlink resource is used to send the network-coded original packet.

For example, the second scheduling information carries a second indication, and the second indication indicates that the second downlink resource is used to send the network-coded original packet.

According to a fifth aspect, a communication method is provided. First, a terminal device (or a chip in the terminal device) receives a configuration message of a radio bearer from an access network device, where the configuration message includes configuration information of a first radio link control RLC bearer, configuration information of a second RLC bearer, and PDCP configuration information, the PDCP configuration information includes a first proportion, and the first proportion is a ratio of a first quantity of network-coded packets transmitted on the first RLC to a second quantity of network-coded packets transmitted on the second RLC. The terminal device establishes a first RLC entity and a second RLC entity based on the configuration message. Therefore, the terminal device may establish the first RLC entity and the second RLC entity based on configuration of the access network device, to support requirement-based transmission of the network-coded redundant packet.

Optionally, the method further includes: A PDCP entity of the terminal device sends the first quantity of network-coded packets to the first RLC entity, and sends the second quantity of network-coded packets to the second RLC entity. The terminal device sends the first quantity of network-coded packets in the first RLC entity to the access network device, where a first logical channel is associated with the first RLC entity, a priority of the first logical channel is higher than a priority of a second logical channel, and the second logical channel is associated with the second RLC entity.

Optionally, the method further includes: The terminal device sends the second quantity of network-coded packets in the second RLC entity to the access network device.

According to a sixth aspect, a communication method is provided. The method includes: An access network device (or a chip in the access network device) sends a configuration message of a radio bearer to a terminal device, where the configuration message includes configuration information of a first radio link control RLC bearer, configuration information of a second RLC bearer, and PDCP configuration information, the PDCP configuration information includes a first proportion, and the first proportion is a ratio of a first quantity of network-coded packets transmitted on the first RLC to a second quantity of network-coded packets transmitted on the second RLC. Therefore, the access network device may configure the terminal device to split a network-coded redundant packet and a network-coded original packet to different RLC entities in a quantity manner, so that the network-coded redundant packet can be transmitted as required. The access network device may configure the terminal device to establish a first RLC entity and a second RLC entity, to support requirement-based transmission of the network-coded redundant packet.

According to a seventh aspect, a communication method is provided. The method includes: First, a PDCP layer of a terminal device generates first data, and sends the first data to a first RLC entity, where the first RLC entity generates N corresponding network-coded original packets based on the first data, and N is a positive integer. The terminal device receives first uplink grant information from an access network device, where the first uplink grant information indicates scheduling of a first HARQ process. The terminal device obtains M network-coded original packets in the N network-coded original packets from the first RLC entity based on the first uplink grant information, and generates a first TB, where the first TB is stored in a buffer of the first HARQ process; and a second RLC entity of the terminal device generates a network-coded redundant packet based on the M network-coded original packets, the network-coded redundant packet generated by the second RLC entity is stored in a buffer of a second HARQ process, and M is a positive integer and is less than or equal to N.

The network-coded redundant packet stored in the buffer of the second HARQ process is sent after the terminal device receives second uplink grant information, the second uplink grant information is different from the first uplink grant information, and a process ID of the first HARQ process is different from a process ID of the second HARQ process.

Alternatively, the network-coded redundant packet stored in the buffer of the second HARQ process is sent based on the first uplink grant information, a sending priority of the network-coded redundant packet is lower than a sending priority of the first TB stored in the buffer of the first HARQ process, and a process ID of the first HARQ process is the same as a process ID of the second HARQ process.

Based on the foregoing solution, one HARQ process is introduced at a MAC layer, to store a network-coded redundant packet generated by a TB of a network-coded original packet, that is, a TB-level redundant packet is generated in real time, so that system consumption can be reduced, and the network-coded redundant packet can be conveniently obtained.

In a first implementation, the second HARQ process is a real HARQ process, and has a HARQ process ID. In this case, the process ID of the first HARQ process is different from the process ID of the second HARQ process.

In an implementation, when the process ID of the first HARQ process is different from the process ID of the second HARQ process, the method further includes: The terminal device receives first configuration information from the access network device, where the first configuration information is used to configure a relationship between the process ID of the first HARQ process and the process ID of the second HARQ process, and the network-coded redundant packet stored in the buffer of the second HARQ process indicated by the process ID of the second HARQ process is generated based on the network-coded original packet stored in the buffer of the first HARQ process indicated by the process ID of the first HARQ process. Therefore, the terminal device receives the first configuration information from the access network device, to obtain one real HARQ process. The real HARQ process is used to store the network-coded redundant packet, and may learn of a relationship between the real HARQ process and the first HARQ process.

In a second implementation, the second HARQ process is a virtual HARQ process. In this case, that the second HARQ process and the first HARQ process share one process ID may be understood as sharing a buffer of one HARQ process.

In another implementation, when the process ID of the first HARQ process and the process ID of the second HARQ process are the same, that the first uplink grant information indicates scheduling of a first HARQ process includes: The first uplink grant information indicates an uplink grant, and the uplink grant supports sending of the network-coded original packet and the network-coded redundant packet.

In this implementation, optionally, the method further includes: receiving second configuration information from the access network device, where the second configuration information is used to configure the second HARQ process.

Optionally, the method further includes: The PDCP layer of the terminal device generates second data, and sends the second data to the second RLC entity of the terminal device, where the first data and the second data are duplicate data of each other; and that a second RLC entity generates a network-coded redundant packet based on the M network-coded original packets includes: The second RLC entity generates the network-coded redundant packet based on M network-coded original packets in the second data, where the M network-coded original packets in the second data and the M network-coded original packets in the first data are duplicate data.

Optionally, the method further includes: When the terminal device determines to clear the network-coded original packet in the buffer of the first HARQ process, the terminal device clears the network-coded redundant packet in the buffer of the second HARQ process, where "Clearing" may be understood as deletion, erasing, discarding, or the like.

According to an eighth aspect, a communication method is provided. The method includes: First, an access network device determines first uplink grant information, where the first uplink grant information indicates scheduling of a first HARQ process, a buffer of the first HARQ process is used to store a first TB, the first TB is generated based on M network-coded original packets in N network-coded original packets, and a buffer of a second HARQ process stores a network-coded redundant packet generated based on the M network-coded original packets. Then, the access network device sends the first uplink grant information to a terminal device.

Based on the foregoing solution, one HARQ process is introduced at a MAC layer, to store a network-coded redundant packet generated by a TB of a network-coded original packet, that is, a TB-level redundant packet is generated in real time, so that system consumption can be reduced.

In a first implementation, the second HARQ process is a real HARQ process, and has a HARQ process ID. In this case, a process ID of the first HARQ process is different from a process ID of the second HARQ process.

When the process ID of the first HARQ process is different from the process ID of the second HARQ process, the method further includes: The access network device sends first configuration information to the terminal device, where the first configuration information is used to configure a relationship between the process ID of the first HARQ process and the process ID of the second HARQ process, and the network-coded redundant packet stored in the buffer of the second HARQ process indicated by the process ID of the second HARQ process is generated based on the network-coded original packet stored in the buffer of the first HARQ process indicated by the process ID of the first HARQ process. Therefore, the access network device may configure a real HARQ process for the terminal device. The real HARQ process is used to store the network-coded redundant packet, and may configure a relationship between the real HARQ process and the first HARQ process.

In a second implementation, the second HARQ process is a virtual HARQ process. In this case, that the second HARQ process and the first HARQ process share one process ID may be understood as sharing a buffer of one HARQ process.

When the process ID of the first HARQ process and the process ID of the second HARQ process are the same, that the first uplink grant information indicates scheduling of a first HARQ process includes: The first uplink grant information indicates an uplink grant, and the uplink grant supports sending of the network-coded original packet and the network-coded redundant packet.

In a second implementation, the access network device may configure the terminal device to support the second HARQ process. Optionally, the method further includes: The access network device sends second configuration information to the terminal device, where the second configuration information is used to configure the second HARQ process.

In the seventh aspect and the eighth aspect, the first RLC entity and the second RLC entity may be a same RLC entity, or may be different RLC entities.

That the first RLC entity and the second RLC entity are a same RLC entity may bring the following benefit: Overheads for maintaining the RLC entity on a terminal device side are reduced.

According to a ninth aspect, a communication apparatus is provided. The communication apparatus includes modules or units configured to perform the method according to any possible implementation of the first aspect, the third aspect, the fifth aspect, or the seventh aspect.

According to a tenth aspect, a communication apparatus is provided. The communication apparatus includes a processor. The processor is coupled to a memory, and may be configured to execute instructions in the memory, to implement the method according to any possible implementation of the first aspect, the third aspect, the fifth aspect, or the seventh aspect. Optionally, the communication apparatus further includes the memory. Optionally, the communication apparatus further includes a communication interface, and the processor is coupled to the communication interface.

In an implementation, the communication apparatus is a terminal device, for example, a terminal device or an access point. When the communication apparatus is the terminal device, the communication interface may be a transceiver or an input/output interface.

In another implementation, the communication apparatus is a chip configured in a terminal device. When the communication apparatus is the chip configured in the terminal device, the communication interface may be an input/output interface.

Optionally, the transceiver may be a transceiver circuit. Optionally, the input/output interface may be an input/output circuit.

According to an eleventh aspect, a communication apparatus is provided. The communication apparatus includes modules or units configured to perform the method according to any possible implementation of the second aspect, the fourth aspect, the sixth aspect, or the eighth aspect.

According to a twelfth aspect, a communication apparatus is provided. The communication apparatus includes a processor. The processor is coupled to a memory, and may be configured to execute instructions in the memory, to implement the method according to any possible implementation of the second aspect, the fourth aspect, the sixth aspect, or the eighth aspect. Optionally, the communication apparatus further includes the memory. Optionally, the communication apparatus further includes a communication interface, and the processor is coupled to the communication interface.

In an implementation, the communication apparatus is an access network device, for example, a base station. When the communication apparatus is the access network device, the communication interface may be a transceiver or an input/output interface.

In another implementation, the communication apparatus is a chip configured in an access network device. When the communication apparatus is the chip configured in the access network device, the communication interface may be an input/output interface.

Optionally, the transceiver may be a transceiver circuit. Optionally, the input/output interface may be an input/output circuit.

According to a thirteenth aspect, a processor is provided. The processor includes an input circuit, an output circuit, and a processing circuit. The processing circuit is configured to: receive a signal through the input circuit, and transmit a signal through the output circuit, so that the processor performs the method according to any possible implementation of the first aspect to the eighth aspect.

In an implementation process, the processor may be a chip. The input circuit may be an input pin. The output circuit may be an output pin. The processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a fourteenth aspect, an apparatus is provided. The apparatus includes a processor and a memory. The processor is configured to read instructions stored in the memory, and may receive a signal through a receiver, and transmit a signal through a transmitter, to perform the method according to any possible implementation of the first aspect to the eighth aspect.

Optionally, there are one or more processors, and there are one or more memories.

Optionally, the memory may be integrated with the processor, or the memory and the processor are separately disposed.

In an implementation process, the memory may be a non-transitory memory, for example, a read-only memory (ROM). The memory and the processor may be integrated on a same chip, or may be separately disposed on different chips. A type of the memory and a manner in which the memory and the processor are disposed are not limited in this embodiment of this application.

It should be understood that, a related data exchange process, for example, sending of information may be a process of outputting the information from the processor, and receiving of information may be a process of receiving the input information by the processor. Data output by the processor may be output to the transmitter, and input data received by the processor may be from the receiver. The transmitter and the receiver may be collectively referred to as a transceiver.

The apparatus in the fourteenth aspect may be a chip. The processor may be implemented by hardware, or may be implemented by software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a fifteenth aspect, a computer program product is provided. The computer program product includes a computer program (which may also be referred to as code or instructions). When the computer program is run, a computer is enabled to perform the method according to any possible implementation of the first aspect to the eighth aspect.

According to a sixteenth aspect, a computer-readable storage medium is provided. The computer-readable storage medium stores a computer program (which may also be referred to as code or instructions). When the computer program is run on a computer, the computer is enabled to perform the method according to any possible implementation of the first aspect to the eighth aspect.

According to a seventeenth aspect, a communication system is provided. The communication system includes the foregoing terminal device and the foregoing access network device.

DESCRIPTION OF EMBODIMENTS

The following describes technical solutions of this application with reference to accompanying drawings.

The technical solutions in embodiments of this application may be applied to various communication systems, including but not limited to a 5th generation (5G) system or a new radio (NR) system, a long term evolution (LTE) system, an LTE frequency division duplex (FDD) system, an LTE time division duplex (TDD) system, and the like. The technical solutions provided in this application may alternatively be applied to a future communication system, for example, a 6th generation mobile communication system. In addition, the technical solutions may alternatively be applied to device-to-device (D2D) communication, vehicle-to-everything (V2X) communication, machine-to-machine (M2M) communication, machine-type communication (MTC), an internet of things (IoT) communication system, another communication system, or the like.

The communication system applicable to this application may include one or more transmit ends and one or more receive ends. Optionally, one of the transmit end and the receive end may be a terminal device, and the other may be an access network device.

Figure 1:
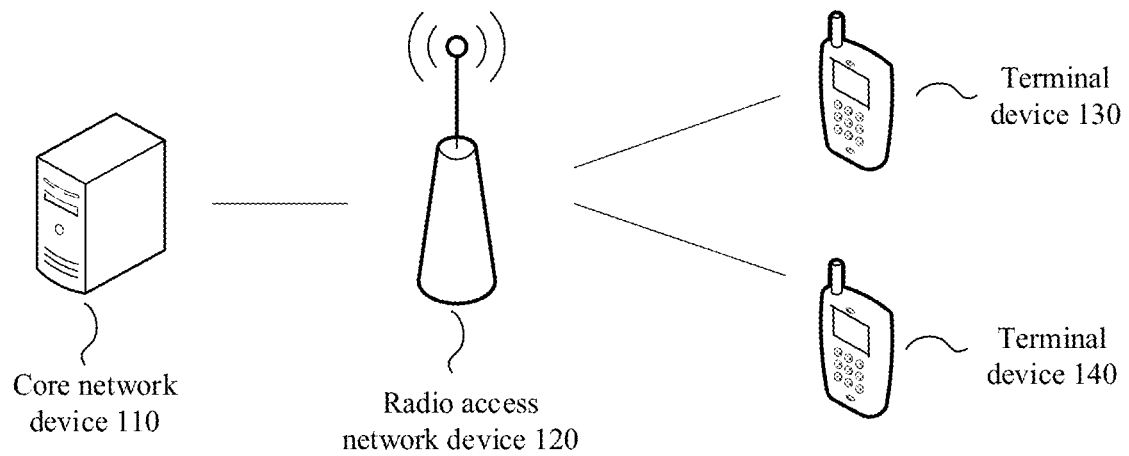
FIG. 1 is a schematic diagram of an architecture of a mobile communication system to which an embodiment of this application is applied.

FIG. 1 is a schematic diagram of an architecture of a mobile communication system to which an embodiment of this application is applied. As shown in FIG. 1, the mobile communication system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be separate standalone physical devices, or functions of the core network device and logical functions of the radio access network device may be integrated into one physical device, or a part of functions of the core network device and a part of functions of the access network device may be integrated into one physical device. The terminal device may be located at a fixed location, or may be mobile. FIG. 1 is merely a schematic diagram. The communication system may further include other network devices, for example, may further include a wireless relay device and a wireless backhaul device, which are not drawn in FIG. 1. Quantities of core network devices, radio access network devices, and terminal devices included in the mobile communication system are not limited in embodiments of this application.

Different access networks may use different access technologies. Currently, there are two types of radio access technologies: a 3rd generation partnership project (3GPP) access technology (for example, a radio access technology used in a 3rd generation (3G), 4th generation (4G), or 5G system) and a non-3rd generation partnership project (non-3GPP) access technology. The 3GPP access technology is an access technology that complies with a 3GPP standard specification. An access network using the 3GPP access technology is referred to as a radio access network (RAN), and an access network device in a 5G system is referred to as a next-generation NodeB (gNB). The non-3GPP access technology is an access technology that does not comply with the 3GPP standard specification, for example, an air interface technology represented by an access point (AP) in wireless fidelity (Wi-Fi). An access network that implements a network access function by using a wireless communication technology may be referred to as a radio access network RAN. A 5G radio access network in 3GPP may be referred to as a next-generation radio access network (NG-RAN).

The radio access network device may be a device having a wireless transceiver function. The radio access network device may be a device that provides a wireless communication function service, and is usually located on a network side, including but not limited to a next-generation NodeB (gNodeB, gNB) in a 5G communication system, a base station in a 6th generation (6G) mobile communication system, a base station in a future mobile communication system or an access node and the like in a Wi-Fi system, an evolved NodeB (eNB) in an LTE system, a radio network controller (RNC), a NodeB (NB), a base station controller (BSC), a home base station (for example, a home evolved NodeB, or a home NodeB, HNB), a baseband unit (BBU), a transmission reception point (TRP), a transmission point (TP), a base transceiver station (BTS), and the like. In a network structure, the radio access network device may include a central unit (CU) node, a distributed unit (DU) node, a RAN device including a CU node and a DU node, a control plane CU node and a user plane CU node, and a RAN device of a DU node. Alternatively, the radio access network device may be a radio controller, a relay station, a vehicle-mounted device, a wearable device, and the like in a cloud radio access network (CRAN) scenario. In addition, the base station may be a macro base station, a micro base station, a relay node, a donor node, or a combination thereof. The base station may alternatively be a communication module, a modem, or a chip that is disposed in the foregoing device or apparatus. The base station may alternatively be a mobile switching center, a device that bears a base station function in D2D, V2X, and M2M communication, a network side device in a 6G network, a device that bears a base station function in a future communication system, or the like. The base station may support networks of a same access technology or different access technologies. This is not limited.

In embodiments of this application, an apparatus configured to implement a function of the radio access network device may be an access network device, or may be an apparatus, for example, a chip system or a chip, that can support the access network device in implementing the function. The apparatus may be installed in the access network device. In embodiments of this application, the chip system may include a chip, or may include a chip and another discrete device.

The terminal device may also be referred to as a terminal, user equipment (UE), a mobile station (MS), a mobile terminal (MT), or the like, and may be an entity on a user side configured to receive or transmit a signal, for example, a mobile phone. The terminal device may be UE. The UE includes a handheld device, a vehicle-mounted device, a wearable device, or a computing device having a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. The terminal may be widely applied to various scenarios such as D2D communication, V2X communication, MTC, an IoT, virtual reality, augmented reality, industrial control, self driving, telemedicine, a smart grid, smart furniture, smart office, smart wear, smart transportation, and a smart city. The terminal may be a mobile phone, a tablet computer, a computer having a wireless transceiver function, a wearable device, a vehicle, an unmanned aerial vehicle, a helicopter, an airplane, a ship, a robot, a robot arm, a smart home device, or the like. Optionally, the UE may also be configured to act as a base station. For example, the UE may act as a scheduling entity that provides a sidelink signal between UEs in V2X, D2D, peer-to-peer (P2P), or the like. The access network device and the terminal device may be deployed on land, and include an indoor or outdoor device, a handheld device, or a vehicle-mounted device; or may be deployed on water; or may be deployed on an airplane, a balloon, and a satellite in the air. Application scenarios of the radio access network device and the terminal device are not limited in embodiments of this application.

In embodiments of this application, an apparatus configured to implement a function of the terminal may be a terminal, or may be an apparatus, for example, a chip system or a chip, that can support the terminal in implementing the function. The apparatus may be installed in the terminal. In embodiments of this application, the chip system may include a chip, or may include a chip and another discrete device.

Embodiments of this application are applicable to downlink signal transmission, uplink signal transmission, or D2D signal transmission. For the downlink signal transmission, a sending device is a radio access network device, and correspondingly a receiving device is a terminal device. For the uplink signal transmission, a sending device is a terminal device, and correspondingly a receiving device is a radio access network device. For the D2D signal transmission, a sending device is a terminal device, and correspondingly a receiving device is also a terminal device. A signal transmission direction is not limited in embodiments of this application.

Communication between the access network device and the terminal device and communication between the terminal devices may be performed by using a licensed spectrum, an unlicensed spectrum, or both a licensed spectrum and an unlicensed spectrum. Communication between the access network device and the terminal device and communication between the terminal devices may be performed by using a spectrum below 6 gigahertz (GHz), a spectrum above 6G, or both a spectrum below 6G and a spectrum above 6G. Spectrum resources used between the access network device and the terminal device are not limited in embodiments of this application.

In embodiments of this application, a communication apparatus (the terminal device or the access network device) includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). An operating system may be any one or more types of computer operating systems, for example, a Linux operating system, a Unix operating system, an Android operating system, an iOS operating system, or a Windows operating system, that implement service processing through a process. The application layer includes applications such as a browser, an address book, word processing software, and instant messaging software. In addition, a structure of an execution body of the method provided in embodiments of this application is not limited in embodiments of this application, provided that a program that records code of the method provided in embodiments of this application can be run to perform communication according to the method provided in embodiments of this application. For example, the method provided in embodiments of this application may be performed by a communication apparatus, or a functional module that is in the communication apparatus and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include and/or carry instructions and/or data.

It should be understood that the communication system in FIG. 1 is merely described as an example, and constitutes no limitation on the protection scope of embodiments of this application. The technical solutions in embodiments of this application may also be applied to another communication system.

Figure 2:
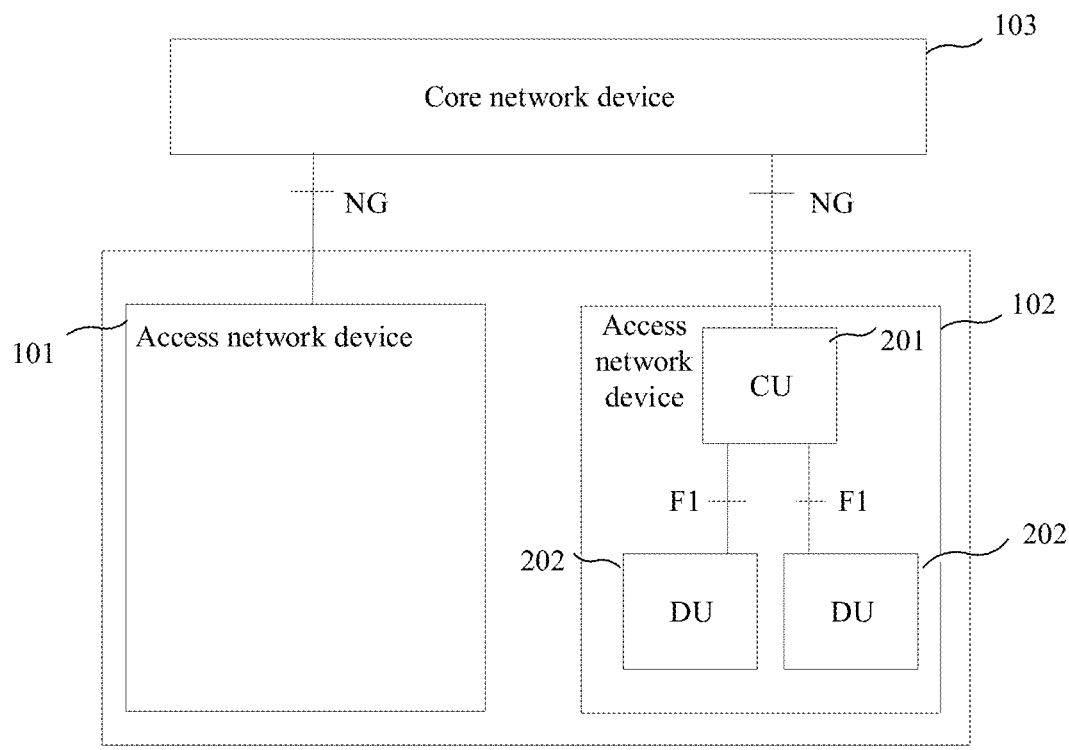
FIG. 2 is a diagram of another communication architecture to which an embodiment of this application is applied.

FIG. 2 is a diagram of another communication architecture to which an embodiment of this application is applied. As shown in FIG. 2, a core network device 103, for example, a 5th generation core network (5GC), may be connected to a complete access network device 101, for example, a gNB, or may be connected to an access network device 102 including a CU 201 and a DU 202. It may be understood that the CU 201 and the DU 202 may be physical entities, or may be software-based or virtualized units. It may be further understood that the CU 201 and the DU 202 may be deployed on a same device, or may be deployed on different devices. This is not limited.

The CU 201 and the DU 202 may be software-based or virtualized units, or may be physical entities. Radio access network functions that need to be flexibly combined run in the CU 201, for example, higher-layer functions such as a service data adaptation protocol (SDAP) layer, a packet data convergence protocol (PDCP) layer, and a radio resource control (RRC) layer. RAN functions that are closely related to hardware and have a high real-time requirement run in the DU 202, for example, bottom-layer functions such as a radio link control (RLC) layer, a physical layer (PHY), and a media access control (MAC) layer.

The CU 201 and the DU 202 are connected to each other through a communication interface. The CU 201 and the core network device are also connected to each other through a communication interface. In embodiments of this application, the communication interface between the CU 201 and the DU 202 may be referred to as an F1 interface. The interface between the CU 201 and the core network device may be referred to as an N2 interface or an NG interface. As shown in FIG. 2, one access network device 102 may include one CU 201 and one or more DUs 202. The CU 201 and the DU 202 are connected to each other through an F1 interface. One DU 202 can be connected to only one CU 201, and one CU 201 may be connected to one or more DUs 202.

For example, the access network device 102 is a gNB. The gNB may include one or more gNB-DUs and one gNB-CU. One gNB-DU is connected to one gNB-CU, and one gNB-CU may be connected to a plurality of gNB-DUs. The gNB-CU and the gNB-DUs connected to the gNB-CU are considered as one gNB for other gNBs and 5GCs.

Figures 3, 4:
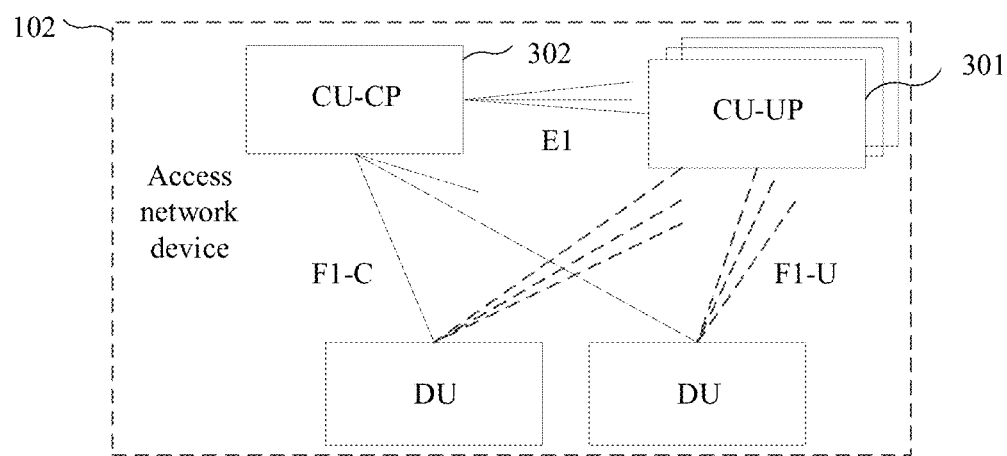
FIG. 3 is a diagram of still another communication architecture to which an embodiment of this application is applied.
FIG. 4 is a schematic diagram of random linear network coding.

FIG. 3 provides a new architecture based on the architecture in FIG. 2. A CU may include a central unit-user plane (CU-UP) 301 and a central unit-control plane (CU-CP) 302. The CU-UP 301 and the CU-CP 302 may be on different physical devices. There may be an open interface between the CU-UP 301 and the CU-CP 302, and the interface may be referred to as an E1 interface. In addition, there may be an interface between a DU and each of the CU-UP 301 and the CU-CP 302. For example, an interface between the CU-CP 302 and the DU is an F1-C interface, and an interface between the CU-UP 301 and the DU is an F1-U interface.

The architecture in FIG. 3 may have the following features: One access network device 102 may include one CU-CP 302, one or more CU-UPs 302, and a plurality of DUs. One DU may be connected to one CU-CP 302. One CU-UP 301 may be connected to only one CU-CP 302. One DU may be connected to a plurality of CU-UPs 301 under control of a same CU-CP 302. One CU-UP 301 may be connected to a plurality of DUs under control of a same CU-CP 302.

For example, the access network device 102 is a gNB. One gNB-DU and one gNB-CU-UP each are connected to only one gNB-CU-CP. Under control of a same gNB-CU-CP, one gNB-DU may be connected to a plurality of gNB-CU-UPs, and one gNB-CU-UP may be connected to a plurality of gNB-DUs.

The foregoing access network device (including the CU, the DU, the CU-CP, or the CU-UP in the access network device) may also be referred to as an access network node, an access network entity, or the like.

A network coding function in this application includes performing network coding on an original data packet and adding a header of a coding packet. Network coding may be implemented through an encoder. An input of the encoder is K original data packets, and an output of the encoder is N coded data packets (which are network-coded packets for short), where both N and K are positive integers, and N is greater than K. The network-coded packets include N-K redundant packets (which may also be referred to as network-coded redundant packets) and K systematic packets (which may also be referred to as network-coded original packets); or include N redundant packets (that is, all coding packets are redundant packets, and do not include a systematic packet). A coding coefficient of the systematic packet is a unit vector, that is, content of the systematic packet is the same as content of the original data packet. A coding coefficient of the redundant packet is a non-unit vector. Through an association between content of the redundant packet and content of an original data packet for generating the redundant packet, a receive end may decode the redundant packet together with a successfully received original data packet or systematic packet, to restore an unsuccessfully received original data packet. A network encoding function of the transmit end corresponds to a network decoding function of the receive end. The receive end may restore the K original data packets by decoding at least K successfully received coding packets together. A protocol layer having a network encoding function or a decoding function corresponding to network encoding is referred to as a network encoding/decoding layer. In this application, the network encoding/decoding layer is a network coding layer for short, that is, the protocol layer having a network coding function is referred to as a network coding layer.

Network coding layer: The network coding layer is a protocol layer having a network coding function. The network coding layer may be one or more of protocol layers having a network coding function, such as an RRC layer, a PDCP layer, a backhaul adaptation protocol (BAP) layer, an RLC layer, or a MAC layer. A specific layer is not limited in this application. Alternatively, the network coding layer may be a new protocol layer other than the foregoing protocol layer. For example, the new protocol layer may be above the PDCP layer, above the BAP layer, between the PDCP layer and the RLC layer, between the RLC layer and the MAC layer, or between the MAC layer and a PHY layer. A location of the new protocol layer may not be limited in this application. In embodiments of this application, the term "network coding layer" may also be referred to as an "encoding/decoding layer", an "encoding/decoding layer", a "network encoding/decoding layer", a "network encoding/decoding layer", a "network encoding/decoding layer", or another name. This is not limited in this application.

For example, the network coding function includes: equal division, coding, coding header addition, and cyclic redundancy check (CRC) addition. CRC addition and another function may be performed at a same protocol layer, or may be performed at different protocol layers. This is not limited herein. Table 1 below provides different solutions.

TABLE 1

| Coding function | Protocol layer for equal division, coding, and coding header addition | Protocol layer for CRC generation/check |
| --- | --- | --- |
| Solution 1 | RLC | RLC |
| Solution 2 | PDCP | PDCP |
| Solution 3 | PDCP | MAC |
| Solution 4 | RLC | MAC |
| Solution 5 | New layer between PDCP and RLC | New layer between PDCP and RLC |
| Solution 6 | New layer between PDCP and RLC | MAC |

It may be understood that Table 1 is merely an example, and does not constitute any limitation on embodiments of this application.

Common network coding solutions include random linear network coding (RLNC), convolutional network coding (CNC), and the like.

FIG. 4 is a schematic diagram of random linear network coding. As shown in FIG. 4, a size of a coding coefficient matrix (namely, $A^{(W+R) \times W}$ in FIG. 4) is (W+R)×W, namely, (W+R) rows and W columns. In this example, a row vector in the coding coefficient matrix is referred to as a coding coefficient vector, and (W+R) coded data packets ($Y^{(W+R) \times 1}$ in FIG. 4) are obtained by performing network coding on one data block ($X^{W \times 1}$ in FIG. 4) including W original data packets, where a corresponding bit rate is represented as W/(W+R), or a corresponding redundancy rate is represented as R/(W+R). The coding coefficient matrix randomly selects a coefficient in a GF(q) field, q represents a size of the Galois field, a value of the Galois field is in an interval [0, q−1], and both W and R are positive integers. It should be understood that, in the RLNC solution, coded data blocks are not associated with each other. One coded data block is (W+R) pieces of coded data obtained by performing network coding on one data block including W original data packets. That is, a coding operation is performed on each independent data block, and redundancy (bit rates) of data block may be the same or may be different. The encoder side/transmit end adds packet header information to the W original data packets and the generated (W+R) pieces of coded data, and then sends the W original data packets and the generated (W+R) pieces of coded data. The decoder side/receive end receives at least W correct coded data packets that are linearly independent of coding coefficient vectors; or receives at least W correct coded data packets, and when a rank of a coding coefficient matrix corresponding to the received coded data packets is W, the W original data packets can be correctly decoded and restored. This is because the coded data packet combines information of multiple original data packets, and therefore the receive end may restore the original data by using the coded data packet.

The following uses an example in which a PDCP SDU is used as a network-coded original packet to describe a process of implementing a network coding function at a PDCP layer of the access network device.

Step 1: The access network device sends an RRC message to the terminal device, and configures a quantity of original coding blocks in one coding group as 120.

Step 2: The PDCP layer of the access network device performs network coding processing on a frame of data, finally generates a packet data convergence protocol control unit (PDCP PDU), and sends the PDCP PDU to an RLC layer.

Figures 5, 6:
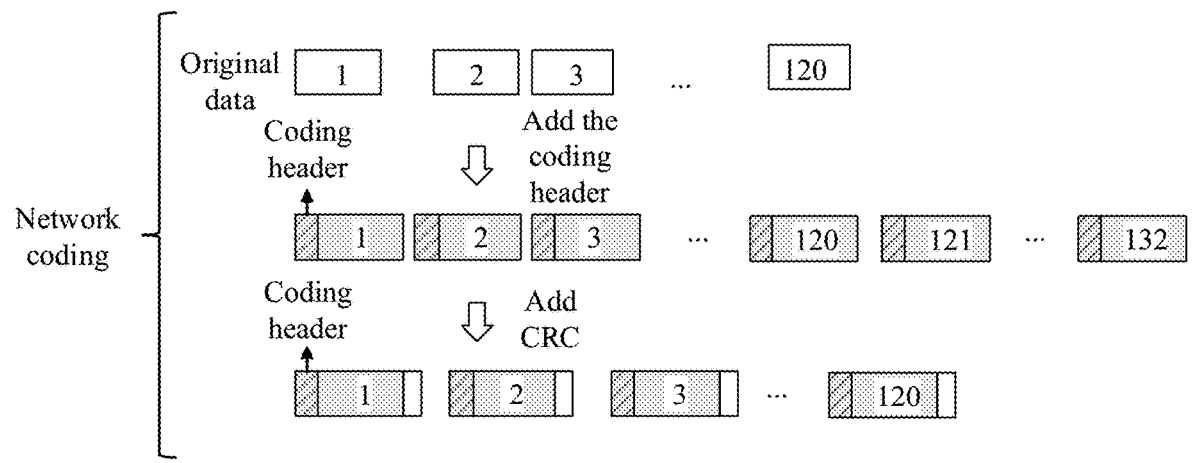
FIG. 5 is a schematic diagram of network coding steps.
FIG. 6 is an example diagram of matrix operation in a network coding process.

As shown in FIG. 5, the detailed steps of performing network coding at the PDCP layer are as follows:

(1) Performing an equal division operation on the original data: The PDCP layer groups 60 data packets into one group, and evenly divides the data packets into 120 data blocks of equal sizes.

(2) Coding and coding header addition: The PDCP layer performs network coding on the 120 small data blocks, adds coding headers, and outputs 120 original blocks and 12 redundant coded blocks after coding. Each small redundant data block is formed by a part of bits of multiple pieces of original data. For a coding process, refer to matrix operation in FIG. 6. As shown in FIG. 6, a vector matrix of 120 columns and 132 rows is a coding codebook. A coding coefficient vector of each row of the vector matrix corresponds to an index (index). x1, x2, . . . , and x120 correspond to small original data blocks; y1, y2, . . . , and y120 correspond to 120 original blocks (which may be referred to as network coded original packets); and y121, y122, . . . , and y132 are redundant coded blocks (which may be referred to as network coded redundant packets).

Each data block has a corresponding generated one coding header. The coding header includes the following information: coding coefficient vector indication information, indicating an index corresponding to a coding coefficient vector in a coding coefficient codebook; and a group number, indicating a code to which a coded block belongs.

(3) CRC addition: A CRC code is generated for each small data block with a coding header, and is added to a coded block to generate a final coded block. For details about the manner of CRC generation, refer to CRC calculation in the protocol TS 38.212.

It should be understood that Step (1) in which the evenly divided 120 data blocks of equal sizes is optional, that is, the step of equal division is omitted. If step (1) of the equal division operation is not performed, in Step (2), network coding is performed on 60 data packets that are not evenly divided in Step (1). Advantages of not performing equal division are that possible segmentation and concatenation operations at the PDCP layer are avoided, complexity of the PDCP layer is reduced, and sending overheads can be reduced.

The foregoing uses a PDCP SDU as an example to describe a network coding processing process. The PDCP SDU may be a PDCP SDU on which header compression is performed but security processing is not performed, or a PDCP SDU on which header compression and security processing are performed.

Step 3: The RLC layer of the access network device receives the coded block, adds an RLC header to the coded block, generates an RLC PDU, and delivers the RLC PDU to a MAC layer. The MAC layer adds a MAC subheader to the RLC PDU to generate a MAC sub-PDU. The MAC layer selects MAC sub-PDUs in descending order based on sizes of sending resources and logical channel priorities, and multiplexes the MAC sub-PDUs together to form a MAC PDU. One MAC PDU corresponds to a transport block (TB), and is delivered to a physical layer to add CRC to generate the TB for sending.

Step 4: The terminal device receives the TB on a PDSCH based on downlink control information on a PDCCH. The physical layer delivers, to the MAC layer, the TB that passes TB CRC check. The MAC layer of the terminal device parses the MAC sub-PDU, and delivers the MAC SDU to the RLC layer based on an identifier of a logical channel in a MAC sub-PDU subheader, and then the RLC layer delivers the coded block to the PDCP layer.

Step 5: The PDCP layer of the terminal device performs network decoding.

A network decoding process is as follows:

(1) Each coded block is extracted based on a size of the coded block.

(2) A coding header is parsed from a coded block that passes CRC check, to obtain a group number of the coded block.

(3) 120 coded blocks that pass the CRC check and that belong to a same group number are decoded together, so that 60 PDCP PDUs can be restored.

For ease of understanding embodiments of this application, the following briefly describes terms or concepts used in this application.

The data packet is original data, and may also be referred to as an original packet.

The network-coded original packet (also referred to as a systematic packet) is obtained by adding a coding packet header to coded data generated by multiplying an original data packet by a coding coefficient of a unit vector, or by directly adding a coding packet header to an original data packet. For example, the original data packet uses a coding coefficient matrix with a size of (W+R)×W (namely, A(W+R)×W in FIG. 4) to perform network coding to obtain (W+R) coded data packets, where the coding coefficient matrix may be written as $$\begin{bmatrix} I_W \\ G_{R \times W} \end{bmatrix},$$

a submatrix $I_W$ formed by the first W rows is a unit matrix and is formed by W unit vectors, W pieces of coded data, in the obtained (W+R) pieces of coded data, that correspond to the $I_W$ part are data parts of W systematic packets, and the coded data to which packet header information is added is the systematic packet.

The network-coded redundant packet is generated by performing network coding on the original data packet, where a coding coefficient of the redundant packet is a non-unit vector. For example, a coding coefficient matrix with a size of (W+R)×W (namely, A(W+R)×W in FIG. 4) is used to perform network coding to obtain (W+R) pieces of coded data, where the coding coefficient matrix may be written as $$\begin{bmatrix} I_W \\ G_{R \times W} \end{bmatrix},$$

R pieces of coded data, in the (W+R) pieces of coded data, that correspond to a $G_{R \times W}$ part are data parts of R redundant coding packets, and the R pieces of coded data to which packet header information is added are redundant packets. In embodiments of this application, the term "redundant packet" may be a "parity packet" for short, and the two may be interchangeably used.

The data packet in the foregoing concept may be replaced with a data sub-packet or a data symbol. The data packet/data sub-packet/symbol may represent data of a length.

The data block/packet includes a set of several original data packets.

An encoded data block/group is a set of coded data packets generated by encoding an original data packet in a same data block/group.

In a current network coding packet transmission solution, the network-coded original packet and the network-coded redundant packet are sent through a same RLC entity. If the receive end has received sufficient network-coded original packets, the data packets may be restored. In this case, if the transmit end sends the network-coded packets again, a waste is caused.

In view of this, in embodiments of this application, at least two RLC entities are introduced to respectively transmit a network-coded original packet and a network-coded redundant packet, to reduce unnecessary redundant transmission and improve resource utilization efficiency.

The communication method in embodiments of this application is applicable to uplink network coding transmission, and is also applicable to downlink network coding transmission. In other words, regardless of an uplink or a downlink, at least two RLC entities may be introduced for transmission, where one RLC entity is configured to transmit the network-coded original packet, and the other RLC entity is configured to transmit the network-coded redundant packet.

The following first describes some embodiments in uplink transmission.

Figure 7:
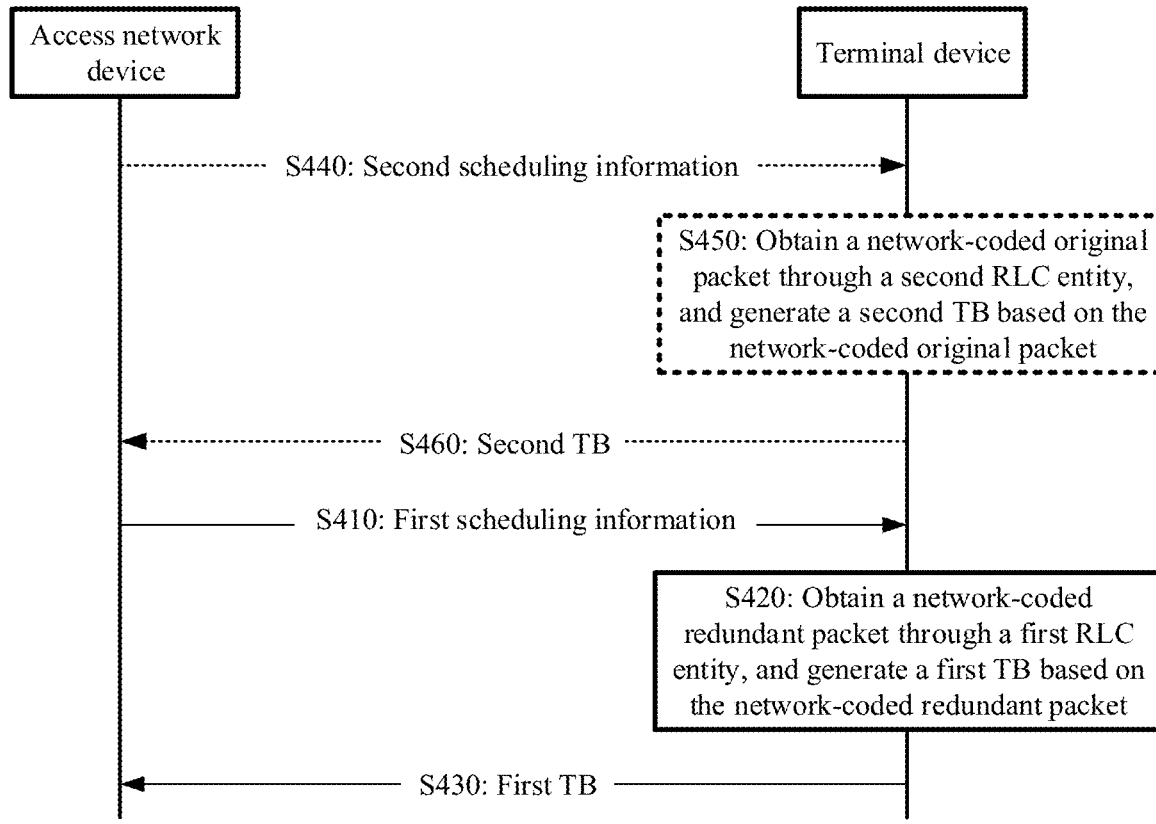
FIG. 7 is a schematic interaction diagram of a communication method according to an embodiment of this application.

FIG. 7 describes a communication method 400 according to an embodiment of this application. As shown in FIG. 7, the communication method 400 includes the following steps.

S410: An access network device sends first scheduling information to a terminal device, where the first scheduling information indicates that a first uplink grant resource is used to support sending of a network-coded redundant packet. Correspondingly, the terminal device receives the first scheduling information from the access network device.

That the first scheduling information indicates that a first uplink grant resource is used to support sending of a network-coded redundant packet includes: The first scheduling information may explicitly indicate that the first uplink grant resource is used to support sending of the network-coded redundant packet; or the first scheduling information may implicitly indicate that the first uplink grant resource is used to support sending of the network-coded redundant packet.

The "explicit indication" means that the first uplink grant resource is indicated by using an information element to support sending of the network-coded redundant packet. For example, the first scheduling information carries a first indication, and the first indication indicates that the first uplink grant resource is used to support sending of the network-coded redundant packet.

The "implicit indication" means that the first scheduling information does not need to carry the first indication, but it is considered by default that the first uplink grant resource supports sending of the network-coded redundant packet. In other words, if the terminal device receives the first scheduling information, it is considered that the first uplink grant resource is used to support sending of the network-coded redundant packet.

It may be optional that the first scheduling information indicates that the first uplink grant resource is used to support sending of the network-coded redundant packet. In other words, the first scheduling information may not indicate that the first uplink grant resource is used to support sending of the network-coded redundant packet. It may be understood that the first scheduling information in step S410 may be existing scheduling information, and the terminal device does not sense whether the first uplink grant resource supports transmission of the network-coded redundant packet. The terminal device may determine, based on a sending priority of a logical channel associated with an RLC entity, when to send the network-coded redundant packet. For example, if a sending priority of a logical channel associated with a first RLC entity is lower than a sending priority of a logical channel associated with a second RLC entity, the terminal device naturally sends data of the first RLC entity on the low-priority logical channel after sending data of the second RLC entity on the high-priority logical channel.

S420: The terminal device obtains the network-coded redundant packet through the first RLC entity, and generates a first TB based on the network-coded redundant packet, where the first RLC entity is configured to transmit the network-coded redundant packet, the first RLC entity is independent of the second RLC entity, and the second RLC entity is configured to transmit a network-coded original packet.

S430: The terminal device sends the first TB to the access network device on the first uplink grant resource, where the first TB includes the network-coded redundant packet. Correspondingly, the access network device receives the first TB.

In this embodiment of this application, after receiving the first scheduling information of the access network device, the terminal device obtains the network-coded redundant packet through the first RLC entity, and then generates and sends the first TB based on the network-coded redundant packet. In other words, the terminal device sends the first TB to the access network device only when the network-coded redundant packet needs to be sent, so that unnecessary redundant transmission can be reduced, and resource utilization can be improved.

The first uplink grant resource may not only support sending of the network-coded redundant packet, but also be used to send the initially transmitted network-coded original packet.

Optionally, the method further includes: The terminal device sends the initially transmitted network-coded original packet to the access network device on the first uplink grant resource.

For example, after the terminal device sends the network-coded original packet to the access network device, if a quantity of network-coded original packets received by the access network device is insufficient and data packet restoration cannot be performed, the access network device may schedule the terminal device to send the network-coded redundant packet. Further, the access network device may schedule the terminal device to send an unsuccessfully transmitted network-coded original packet (or the initially transmitted network-coded original packet).

For the access network device, when scheduling the terminal device to send the network-coded packet, the access network device performs scheduling based on the priority of the logical channel, and preferentially schedules a network-coded original packet carried on a logical channel with a high sending priority.

For example, a sending priority of a second logical channel associated with the second RLC entity is higher than a sending priority of a first logical channel associated with the first RLC entity, the first logical channel carries the network-coded redundant packet, and the second logical channel carries the network-coded original packet.

The foregoing describes an implementation in which the terminal device sends the network-coded redundant packet on the first uplink grant resource. The sending of the network-coded redundant packet may occur when the quantity of network-coded original packets sent by the terminal device is insufficient. In other words, before sending the network-coded redundant packet, the terminal device may first send the network-coded original packet to the access network device. That is, the access network device first schedules the terminal device to send the network-coded original packet.

Optionally, before that an access network device sends first scheduling information to a terminal device, the method 400 further includes:

S440: The access network device sends second scheduling information to the terminal device, where the second scheduling information indicates that a second uplink grant resource is used to send the network-coded original packet. Correspondingly, the terminal device receives the second scheduling information from the access network device.

That the second scheduling information indicates that a second uplink grant resource is used to send the network-coded original packet includes: The second scheduling information may explicitly indicate that the second uplink grant resource is used to send the network-coded original packet; or the second scheduling information may implicitly indicate that the second uplink grant resource is used to send the network-coded original packet.

The "explicit indication" means that the second uplink grant resource is indicated by using an information element to send the network-coded original packet. For example, the second scheduling information carries a second indication, and the second indication indicates that the second uplink grant resource is used to send the network-coded original packet.

The "implicit indication" means that the second scheduling information does not need to carry the second indication, but it is considered by default that the second uplink grant resource is used to send the network-coded original packet. In other words, if the terminal device receives the second scheduling information, it is considered that the second uplink grant resource is used to send the network-coded original packet.

It may be optional that the second scheduling information indicates that the second uplink grant resource is used to send the network-coded original packet. In other words, the second scheduling information may not indicate that the second uplink grant resource is used to send the network-coded original packet. It may be understood that the second scheduling information in step S440 may be existing scheduling information, and the terminal device does not sense whether the second uplink grant resource is used to send the network-coded original packet. The terminal device may determine, based on a sending priority of a logical channel associated with an RLC entity, when to send the network-coded original packet. For example, if a sending priority of a logical channel associated with the first RLC entity is lower than a sending priority of a logical channel associated with the second RLC entity, the terminal device naturally preferentially sends data of the second RLC entity on the high-priority logical channel.

S450: The terminal device obtains the network-coded original packet through the second RLC entity, and generates a second transport block TB based on the network-coded original packet.

S460: The terminal device sends the second TB to the access network device on the second uplink grant resource. Correspondingly, the access network device receives the second TB.

After receiving the second scheduling information of the access network device, the terminal device obtains the network-coded original packet from the second RLC entity, generates the second TB based on the network-coded original packet, and sends the second TB to the access network device on the second uplink grant resource indicated by the second scheduling information, where the second TB includes the network-coded original packet. If there is still a network-coded original packet that is not transmitted, the terminal device may send, on the first uplink grant resource, the initially transmitted network-coded original packet to the access network device. In comparison with a conventional-technology solution in which one RLC entity sends a network-coded original packet and a network-coded redundant packet, in this embodiment of this application, the first RLC entity transmits the network-coded redundant packet, and the second RLC entity transmits the network-coded original packet, so that requirement-based transmission of the network-coded redundant packet can be implemented. In this way, transmission of the network-coded redundant packet is triggered when a quantity of successfully transmitted network-coded original packets is insufficient, thereby avoiding unnecessary redundant transmission and helping save resource overheads.

For the access network device, when receiving the second TB, the access network device detects the second TB. Then, the access network device determines, based on a detection result of the second TB, whether to send the first scheduling information to the terminal device. For example, when the second TB does not meet a configuration threshold, the access network device sends the first scheduling information to the terminal device. That the second TB does not meet a configuration threshold includes: The quantity of successfully transmitted network-coded original packets is insufficient.

The configuration threshold may be a configuration threshold of one TB, and includes but is not limited to one or more of the following thresholds:

(1) a code block group (CBG) threshold in one TB, where the threshold may be a proportion (which may be referred to as a CBG error rate) of incorrect CBGs included in one TB, or may be a proportion (which may be referred to as a CBG success rate) of correct CBGs included in one TB;

(2) a CB threshold in one TB, where the threshold may be a proportion (which may be referred to as a CB error rate) of incorrect CBs included in one TB, or may be a proportion (which may be referred to as a CB success rate) of correct CBs included in one TB; and (3) a coding packet threshold in one TB, where the threshold may be a proportion (which may be referred to as a coding error rate) of incorrect network-coded packets included in one TB, or may be a proportion (which may be referred to as a coding packet success rate) of correct network-coded packets included in one TB.

For example, that the second TB does not meet a configuration threshold includes: A quantity of erroneous CBGs in the second TB is greater than or equal to a CBG predetermined threshold; or a quantity of erroneous CBs in the second TB is greater than or equal to a CB predetermined threshold; or a quantity of erroneous coding packets in the second TB is greater than or equal to a quantity of erroneous coding packets threshold. When the second TB does not meet the TB configuration threshold, the access network device may send the first scheduling information to the terminal device, to schedule the network-coded redundant packet or the initially transmitted network-coded original packet.

Optionally, the configuration threshold may be a configuration threshold of one group of TBs, and includes but is not limited to one or more of the following thresholds:

(1) a CBG threshold in one TB group, where the threshold may be a proportion (which may be referred to as a CBG error rate) of incorrect CBGs included in one TB group, or may be a proportion (which may be referred to as a CBG success rate) of correct CBGs included in one TB group;

(2) a CB threshold in one TB group, where the threshold may be a proportion (which may be referred to as a CB error rate) of incorrect CBs included in one TB group, or may be a proportion (which may be referred to as a CB success rate) of correct CBs included in one TB group; and (3) a coding packet threshold in one TB group, where the threshold may be a proportion (which may be referred to as a coding packet error rate) of incorrect network-coded packets included in one TB group, or may be a proportion (which may be referred to as a coding packet success rate) of correct network-coded packets included in one TB group.

For example, one group of TBs may be understood as TBs generated by using data of one frame of image. The second TB may be understood as one TB group, and the TB group includes a plurality of TBs. That the second TB does not meet a configuration threshold includes: A total quantity of incorrect CBGs in the TB group is greater than or equal to a CBG predetermined threshold; or a total quantity of incorrect CBs in the TB group is greater than or equal to a CB predetermined threshold; or a total quantity of incorrect coding packets in the TB group is greater than or equal to a quantity of erroneous coding packets threshold.

In a scenario in which a CU and a DU of the access network device are separated, the configuration threshold is sent by the CU of the access network device to the DU. In a scenario in which the CU and the DU of the access network device are not separated, the configuration threshold is an internal implementation of the access network device.

Optionally, the network-coded redundant packet is generated by performing network coding on the network-coded original packet.

In this embodiment of this application, there are three network coding modes. The terminal device may obtain a coding mode configuration indication from the access network device. The following briefly describes the three coding modes.

Figure 8:
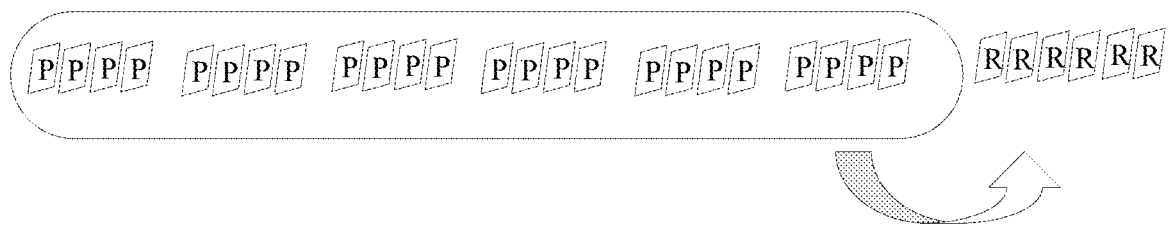
FIG. 8 to FIG. 10 are example diagrams of network coding modes according to an embodiment of this application.

Mode 1: Block network coding. One frame of image is used as an example. Data of one frame of image may be used as a block of network coding, and is used to generate the network-coded original packet and the network-coded redundant packet. The example in FIG. 8 is used as an example. Data of one frame of image may be divided into 24 data blocks, and network coding is performed on the 24 data blocks to obtain 24 network-coded packets (which are identified by P in the figure) and six network-coded original packets (which are identified by R in the figure) shown in FIG. 8.

Figure 9:
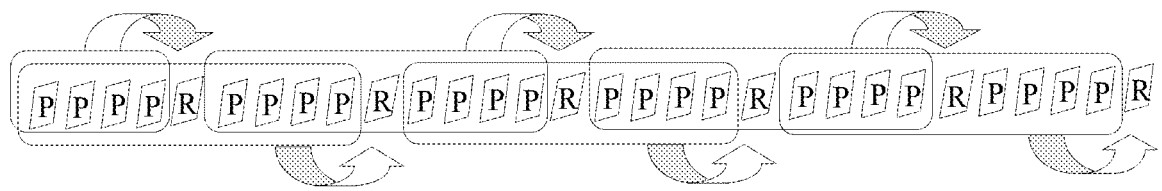

Mode 2: Convolutional network coding. One frame of image is used as an example. Assuming that data of one frame of image is divided into N sub-blocks, data of network coding for the first time is a $1^{st}$ sub-block; and then starting from network coding for the second time, data packets of subsequent network coding for each time includes two nearest sub-blocks, that is, data of every two subsequent sub-blocks other than the $1^{st}$ sub-block is used as a group to generate the network-coded packet. The example in FIG. 9 is used as an example. Data of one frame of image is divided into six sub-blocks, and each sub-block includes four data blocks. After network coding is performed on the $1^{st}$ sub-block, four network-coded original packets (denoted by P in the figure) and one network-coded redundant packet (denoted by R in the figure) are obtained. After network coding is performed on the $1^{st}$ sub-block (which consists of four Ps), a network-coded redundant packet (one R) generated by the $1^{st}$ sub-block, and the $2^{nd}$ sub-block (which consists of four Ps) to obtain a network-coded redundant packet (one R). The rest are deduced by analogy. In the subsequent network coding process, in addition to the sub-block, the network-coded redundant packet may also be used as an input of the network coding. A benefit of this is that the error correction effect is better.

When Mode 2 is used, the terminal device may obtain data from a tail to a header of a buffer of a PDCP entity, that is, a manner of obtaining the data is first-in last-out.

Figure 10:

Mode 3: Sub-block network coding. One frame of image is used as an example. Assuming that data of one frame of image is divided into N sub-blocks, one sub-block is used as a group each time to generate one network-coded redundant packet. A difference between Mode 3 and Mode 2 is that, in Mode 3, the network-coded redundant packet is not used as an input of the network coding. As shown in FIG. 10, data of one frame of image is divided into 6 sub-blocks, and each sub-block (which consists of four data blocks) is used as a group to perform network coding, to obtain four network-coded original packets (which are identified by P in the figure) and generate one network-coded redundant packet (which is identified by R in the figure).

Optionally, a value of N in Mode 2 and Mode 3 may be obtained from the access network device or an application layer.

It should be understood that the foregoing network coding solution is not only applicable to the terminal device, but also applicable to the access network device, that is, the access network device may perform coding by using the foregoing network coding solution.

The foregoing describes an embodiment in which the first RLC entity is used to transmit the network-coded redundant packet, and the second RLC entity is used to transmit the network-coded original packet. Before the first RLC entity is used to transmit the network-coded redundant packet, and the second RLC entity is used to transmit the network-coded original packet, the first RLC entity and the second RLC entity need to be established. The following describes different implementations for establishing the first RLC entity and the second RLC entity. It may be understood that the following embodiments for establishing the first RLC entity and the second RLC entity may be independently implemented, or may be implemented in combination with the foregoing method, or may be implemented in combination with the following method (for example, some embodiments in downlink transmission below).

In a possible implementation, optionally, the method 400 further includes:

The access network device sends a first configuration message of a radio bearer to the terminal device, where the first configuration message includes configuration information of a first radio link control RLC bearer and configuration information of a second RLC bearer. Correspondingly, the terminal device receives the first configuration message of the radio bearer from the access network device.

The configuration information of the first RLC bearer may carry information related to a first logical channel. Optionally, the configuration information of the first RLC bearer includes an identifier of the first logical channel and priority information of the first logical channel.

Optionally, the configuration information of the first RLC bearer indicates that the first logical channel is for transmission of the network-coded redundant packet.

Similarly, the configuration information of the second RLC bearer may carry information related to a second logical channel. Optionally, the configuration information of the second RLC bearer includes an identifier of the second logical channel and priority information of the second logical channel.

Optionally, the configuration information of the second RLC bearer indicates that the second logical channel is for transmission of the network-coded original packet.

Optionally, the first logical channel may belong to a first logical channel group, and the second logical channel may belong to a second logical channel group.

Optionally, the access network device may configure, by using the first configuration message, that a priority of the second logical channel is higher than a priority of the first logical channel.

The terminal device establishes the first RLC entity and the second RLC entity based on the first configuration message.

After receiving the first configuration message, the terminal device may establish the first RLC entity by using the configuration information of the first RLC bearer, and establish the second RLC entity by using the configuration information of the second RLC bearer. The first RLC entity is associated with the first logical channel, and the second RLC entity is associated with the second logical channel.

Optionally, the first configuration message may further include PDCP configuration information. The terminal device establishes a PDCP entity based on the PDCP configuration information, where the PDCP entity is configured to send the network-coded redundant packet to the first RLC entity, and is configured to send the network-coded original packet to the second RLC entity.

In other words, after receiving the PDCP configuration information, the terminal device configures, based on the PDCP configuration information, the PDCP entity to have the following function: The PDCP entity sends, based on an attribute of the network-coded packet, the network-coded redundant packet to the first RLC entity, and sends the network-coded original packet to the second RLC entity.

In an optional implementation, the method 400 further includes:

The access network device sends a second configuration message of a radio bearer to the terminal device, where the second configuration message includes configuration information of a first radio link control RLC bearer, configuration information of a second RLC bearer, and PDCP configuration information, the PDCP configuration information includes a first proportion, and the first proportion is a ratio of a quantity of network-coded packets transmitted by the first RLC entity to a quantity of network-coded packets transmitted by the second RLC entity. Correspondingly, the terminal device receives the second configuration message.

The terminal device establishes the first RLC entity and the second RLC entity based on the second configuration message.

After the terminal device receives the second configuration message, a PDCP layer of the terminal device splits the network-coded redundant packet and the network-coded original packet to the first RLC entity and the second RLC entity based on the first proportion. In other words, this implementation may be understood as splitting the network-coded original packet and the network-coded redundant packet by setting a quantity of coding packets. For example, assuming that the PDCP layer of the terminal device generates 30 network-coded packets, and the first proportion is 6:24, the PDCP layer of the terminal device performs network coding on one frame of data to obtain 30 network-coded packets (which include 24 network-coded original packets and six network-coded redundant packets), sends the six network-coded redundant packets to the first RLC entity, and sends the 24 network-coded original packets to the second RLC entity. This manner is applicable to the foregoing network coding mode 1. In this way, when the terminal device sends the network-coded packet to the access network device, the access network device can determine, based on the quantity of network-coded packets, whether the network-coded redundant packet needs to be scheduled. For example, when determining that the quantity of received network-coded packets is insufficient, the access network device triggers scheduling and transmission of remaining network-coded packets. This helps reduce resource overheads.

The foregoing describes some embodiments in uplink transmission, and the following describes some embodiments in downlink transmission.

Figure 11:
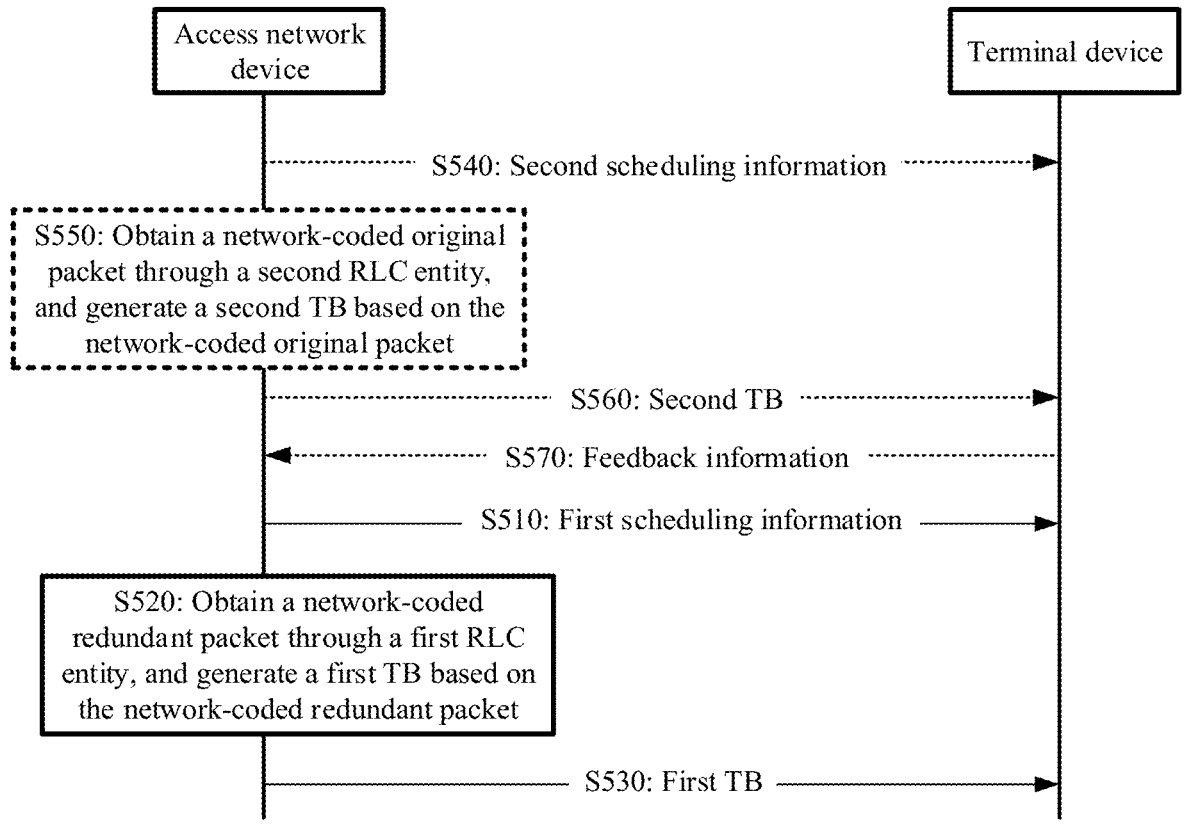
FIG. 11 is a schematic interaction diagram of a communication method according to another embodiment of this application.

FIG. 11 is a schematic interaction diagram of a communication method 500 according to another embodiment of this application. As shown in FIG. 11, the communication method 500 includes the following steps.

S510: An access network device sends first scheduling information to a terminal device, where the first scheduling information indicates that a first downlink resource is used to support sending of a network-coded redundant packet. Correspondingly, the terminal device receives the first scheduling information from the access network device.

That the first scheduling information indicates that a first downlink resource is used to support sending of a network-coded redundant packet includes: The first scheduling information may explicitly indicate that the first downlink resource is used to support sending of the network-coded redundant packet; or the first scheduling information may implicitly indicate that the first downlink resource is used to support sending of the network-coded redundant packet.

The "explicit indication" means that the first downlink resource is indicated by using an information element to support sending of the network-coded redundant packet. For example, the first scheduling information carries a first indication, and the first indication indicates that the first downlink resource is used to support sending of the network-coded redundant packet.

The "implicit indication" means that the first scheduling information does not need to carry the first indication, but it is considered by default that the first downlink resource is used to support sending of the network-coded redundant packet. In other words, if the terminal device receives the first scheduling information, it is considered that the first downlink resource is used to support sending of the network-coded redundant packet.

Optionally, that the first scheduling information indicates that a first downlink resource is used to support sending of a network-coded redundant packet may further indicate that data transmitted by using the first downlink resource includes the network-coded redundant packet. In addition, in addition to the network-coded redundant packet, the data transmitted by using the first downlink resource may also include an initially transmitted network-coded original packet.

S520: The access network device obtains the network-coded redundant packet through a first RLC entity, and generates a first TB based on the network-coded redundant packet, where the first TB includes the network-coded redundant packet; and the first RLC entity and a second RLC entity are established in the access network device, the first RLC entity is configured to transmit the network-coded redundant packet, the first RLC entity is independent of the second RLC entity, and the second RLC entity is configured to transmit the network-coded original packet.

S530: The access network device sends the first TB to the terminal device. Correspondingly, the terminal device receives the first TB. The terminal device parses the first TB, where a data packet obtained through parsing the first TB is processed by the first RLC entity of the terminal device, the data packet obtained through parsing the first TB is the network-coded redundant packet, and the network-coded redundant packet is used to restore an original packet corresponding to a part of network-coded original packets.

Before sending the network-coded redundant packet to the terminal device, the access network device may first send the network-coded original packet to the terminal device. In other words, before sending the first TB to the terminal device, the access network device may further send a second TB to the terminal device.

Optionally, the method 500 further includes:

S540: The access network device sends second scheduling information to the terminal device, where the second scheduling information indicates that a second downlink resource is used to send the network-coded original packet. Correspondingly, the terminal device receives the second scheduling information.

That the second scheduling information indicates that a second downlink resource is used to send the network-coded original packet includes: The second scheduling information may explicitly indicate that the second downlink resource is used to send the network-coded original packet; or the second scheduling information may implicitly indicate that the second downlink resource is used to send the network-coded original packet.

The "explicit indication" means that the second downlink resource is indicated by using an information element to send the network-coded original packet. For example, the second scheduling information carries a second indication, and the second indication indicates that the second downlink resource is used to send the network-coded original packet.

The "implicit indication" means that the second scheduling information does not need to carry the second indication, but indicates, by default, that the second downlink resource is used to send the network-coded original packet. In other words, if the terminal device receives the second scheduling information, it is considered that the second downlink resource is used to send the network-coded original packet.

S550: The access network device may obtain the network-coded redundant packet through the second RLC entity, and generate the second TB based on the network-coded redundant packet.

S560: The access network device sends the second TB to the terminal device on the second downlink resource, where the second TB includes the network-coded original packet. Correspondingly, the terminal device receives the second TB.

After the access network device sends the second TB to the terminal device, when to send the first TB to the terminal device is determined in the following implementations.

In a possible implementation, the first TB may be sent by the access network device after the access network device receives feedback information from the terminal device.

Optionally, in S570, the terminal device sends the feedback information to the access network device, where the feedback information is used to request to transmit the network-coded redundant packet. Correspondingly, the access network device receives the feedback information from the terminal device.

For the terminal device, after receiving the second TB sent by the access network device, the terminal device detects the second TB, and sends the feedback information to the access network device based on a detection result of the second TB. The feedback information may be carried in physical layer signaling (for example, uplink control information carried on a PUCCH) or MAC layer signaling.

Before sending the feedback information, the terminal device may receive a configuration threshold from the access network device, and then determine, based on the configuration threshold, content included in the feedback information. Optionally, the method further includes: The access network device sends the configuration threshold to the terminal device. For descriptions of the configuration threshold, refer to the descriptions in the foregoing embodiments in uplink transmission. The terminal device determines the feedback information based on the configuration threshold and the detection result of the second TB.

It may be understood that the configuration threshold may be carried in an existing message (for example, the configuration message of the radio bearer), or may be a newly defined message. This is not limited herein.

For example, the configuration threshold is an error rate configuration threshold; and that the terminal device determines the feedback information based on the error rate configuration threshold and the detection result of the second TB includes: When an error rate of the second TB is greater than or equal to the error rate configuration threshold, the feedback information includes a NACK, or the feedback information includes a NACK and request information. When an error rate of the second TB is less than the error rate configuration threshold, the feedback information includes request information, or the feedback information includes an ACK and request information.

The configuration threshold may be a configuration threshold of one TB, and includes but is not limited to one or more of the following thresholds:

(1) a CBG threshold in one TB, where the threshold may be a proportion (which may be referred to as a CBG error rate) of incorrect CBGs included in one TB, or may be a proportion of correct CBGs included in one TB;

(2) a CB threshold in one TB, where the threshold may be a proportion (which may be referred to as a CB error rate) of incorrect CBs included in one TB, or may be a proportion of correct CBs included in one TB; and (3) a coding packet threshold in one TB, where the threshold may be a proportion (which may be referred to as a coding error rate) of incorrect network-coded packets included in one TB, or may be a proportion of correct network-coded packets included in one TB.

For example, that the second TB does not meet a configuration threshold includes: A quantity of erroneous CBGs in the second TB is greater than or equal to a CBG predetermined threshold; or a quantity of erroneous CBs in the second TB is greater than or equal to a CB predetermined threshold; or a quantity of erroneous coding packets in the second TB is greater than or equal to an incorrect coding packet threshold. When the second TB does not meet the TB configuration threshold, the access network device may send the first scheduling information to the terminal device, to schedule the network-coded redundant packet or the initially transmitted network-coded original packet.

Optionally, the configuration threshold may be a configuration threshold of one group of TBs, and includes but is not limited to one or more of the following thresholds:

(1) a CBG threshold in one TB group, where the threshold may be a proportion (which may be referred to as a CBG error rate) of incorrect CBGs included in one TB group, or may be a proportion of correct CBGs included in one TB group;

(2) a CB threshold in one TB group, where the threshold may be a proportion (which may be referred to as a CB error rate) of incorrect CBs included in one TB group, or may be a proportion of correct CBs included in one TB group; and (3) a coding packet threshold in one TB group, where the threshold may be a proportion (which may be referred to as a coding error rate) of incorrect network-coded packets included in one TB group, or may be a proportion of correct network-coded packets included in one TB group.

Optionally, for a configuration threshold of one group of TBs, when the access network device schedules the second TB, the access network device determines that the second TB is already the last TB of the group of TBs, and indicates, by using the second scheduling information, that the second TB is already the last TB of the group of TBs, or indicates the terminal device to perform comparison based on the configuration threshold of one group of TBs, to determine the feedback information.

For example, one group of TBs may be understood as TBs generated by using data of one frame of image. The first TB may be understood as one TB group, and the TB group includes a plurality of TBs. That the second TB does not meet a configuration threshold includes: A total quantity of incorrect CBGs in the TB group is greater than or equal to a CBG predetermined threshold; or a total quantity of incorrect CBs in the TB group is greater than or equal to a CB predetermined threshold; or a total quantity of incorrect coding packets in the TB group is greater than or equal to an incorrect coding packet threshold.

For the access network device, if the received feedback information includes a NACK, or the feedback information includes a NACK and request information, or the feedback information includes request information, or the feedback information includes an ACK and request information, the access network device sends the first TB to the terminal device.

In a possible implementation, in addition to the foregoing case, the feedback information may directly or indirectly include the original detection result of the second TB. For example, the feedback information includes an error rate or a success rate of the second TB. The terminal device sends the original detection result of the second TB to the access network device, and the access network device compares the original detection result of the second TB with the configuration threshold, and then determines whether to send the first TB.

In an implementation in which the terminal device reports the original detection result of the second TB, to reduce reporting overheads, a correspondence between the original detection result (for example, the error rate or the success rate of the second TB) of the second TB and an index value may be predefined in a protocol. For example, an error rate (0, 5%) of the second TB corresponds to an index value 0, and an error rate (5%, 10%) of the second TB corresponds to an index value 1. The terminal device may report the index value to the access network device. The access network device may learn of the original detection result of the second TB by using the index value. Certainly, the terminal device may obtain the correspondence from configuration signaling of the access network device.

In another possible implementation, the first TB may be actively sent by the access network device to the terminal device.

For example, if the access network device determines that a frame-level delay budget is close to timeout, and the network-coded original packet cannot be retransmitted in time, the access network device may actively send the first TB to the terminal device. In this way, the access network device may determine when to send the network-coded redundant packet to the terminal device.

This application further provides some embodiments applicable to a scenario in which a CU and a DU are separated. In the scenario in which a CU and a DU are separated, a PDCP layer and an SDAP layer are located in the CU, and an RLC layer and a MAC layer are located in the DU. Assuming that the first RLC entity and the second RLC entity are established, the PDCP layer sends the coding packet to the first RLC entity through a first tunnel, and sends the coding packet to the second RLC entity through a second tunnel. For a tunnel for transmission of the network-coded redundant packet and a tunnel for transmission of the network-coded original packet, there are the following different embodiments.

In a possible embodiment, the CU determines a tunnel for transmitting the network-coded redundant packet and a tunnel for transmitting the network-coded original packet.

Figure 12:
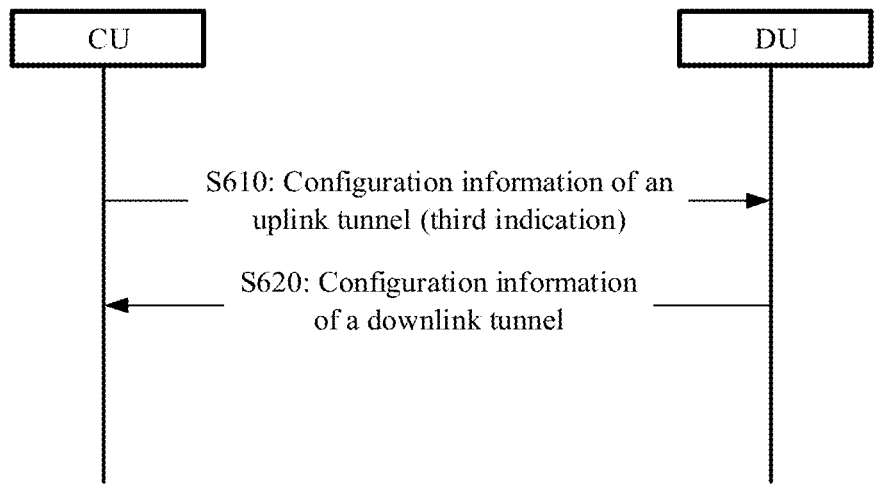
FIG. 12 is a schematic interaction diagram of a communication method according to another embodiment of this application.

FIG. 12 shows a method 600 according to another embodiment of this application. As shown in FIG. 12, the method 600 includes the following steps.

S610: A CU sends configuration information of an uplink tunnel to a DU, where the uplink tunnel includes a first tunnel and a second tunnel, the configuration information of the uplink tunnel includes a third indication, and the third indication indicates that the first tunnel is for transmission of a network-coded redundant packet. Correspondingly, the DU receives the configuration information of the uplink tunnel, and establishes the first tunnel and the second tunnel based on the configuration information of the uplink tunnel.

The third indication may explicitly indicate that the first tunnel is for transmission of the network-coded redundant packet, or may implicitly indicate that the first tunnel is for transmission of the network-coded redundant packet. "Implicitly indicating that the first tunnel is for transmission of the network-coded redundant packet" includes: sending a group of tunnel lists, where a head tunnel or a tail tunnel in a default tunnel list is for transmission of the network-coded redundant packet.

If the configuration information of the uplink tunnel includes the third indication, it may be considered by default that the second tunnel is for transmission of a network-coded original packet, and the DU may be notified of without an additional indication.

It may be understood that the foregoing is merely described by using an example in which the third indication (which indicates that the first tunnel is for transmission of the network-coded redundant packet) included in the configuration information of the uplink tunnel is used. However, this application is not limited thereto. For example, the configuration information of the uplink tunnel may also include an indication indicating that the second tunnel is for transmitting the network-coded original packet. In this case, it may be considered by default that the first tunnel is for transmission of the network-coded redundant packet.

In addition to a case in which the second tunnel is for transmitting the network-coded original packet by default, the DU may also be notified of in an explicit indication manner. Optionally, the configuration information of the uplink tunnel further includes a fourth indication, and the fourth indication indicates that the second tunnel is for transmission of the network-coded original packet.

Optionally, the configuration information of the uplink tunnel further includes uplink tunnel address information of the first tunnel and uplink tunnel address information of the second tunnel.

After receiving the configuration information of the uplink tunnel, the DU may establish a downlink tunnel based on the configuration information of the uplink tunnel, and send configuration information of the downlink tunnel to the CU.

S620: The DU sends the configuration information of the downlink tunnel to the CU, where the configuration information of the downlink tunnel includes information corresponding to the first tunnel and information corresponding to the second tunnel.

Optionally, the information corresponding to the first tunnel includes an identifier of a first logical channel and downlink tunnel address configuration information.

Optionally, the information corresponding to the second tunnel includes an identifier of a second logical channel and downlink tunnel address configuration information.

Therefore, in the foregoing method 600, the CU may determine a tunnel for transmitting the network-coded redundant packet and a tunnel for transmitting the network-coded original packet, and notify the DU.

In a possible embodiment, the DU determines a tunnel for transmitting the network-coded redundant packet and a tunnel for transmitting the network-coded original packet.

Figure 13:
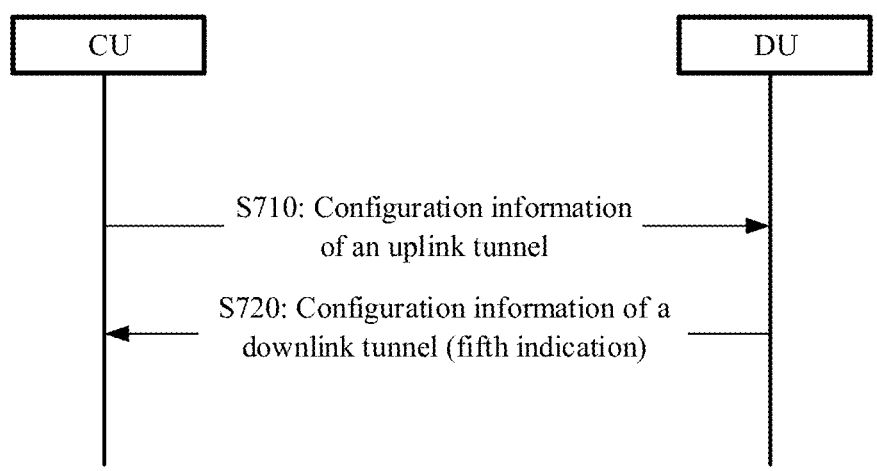
FIG. 13 is a schematic interaction diagram of a communication method according to another embodiment of this application.

FIG. 13 shows a method 700 according to another embodiment of this application. As shown in FIG. 13, the method 700 includes the following steps.

S710: A CU sends configuration information of an uplink tunnel to a DU, where the uplink tunnel includes a first tunnel and a second tunnel.

Optionally, the configuration information of the uplink tunnel includes uplink tunnel address information of the first tunnel and uplink tunnel address information of the second tunnel.

S720: The DU sends configuration information of a downlink tunnel to the CU, where the configuration information of the downlink tunnel includes a fifth indication, and the fifth indication indicates that the first tunnel is for transmission of a network-coded redundant packet. For descriptions of the fifth indication, refer to the descriptions of the third indication in step S610.

If the configuration information of the downlink tunnel includes the fifth indication, it may be considered by default that the second tunnel is for transmission of a network-coded original packet, and the CU may be notified of without an additional indication.

It may be understood that the foregoing is merely described by using an example in which the fifth indication (which indicates that the first tunnel is for transmission of the network-coded redundant packet) included in the configuration information of the downlink tunnel is used. However, this application is not limited thereto. For example, the configuration information of the downlink tunnel may also include an indication indicating that the second tunnel is for transmitting the network-coded original packet. In this case, it may be considered by default that the first tunnel is for transmission of the network-coded redundant packet.

In addition to a case in which the second tunnel is for transmitting the network-coded original packet by default, the CU may also be notified of in an explicit indication manner.

Optionally, the configuration information of the downlink tunnel further includes a sixth indication, and the sixth indication indicates that the second tunnel is for transmission of the network-coded original packet. For descriptions of the sixth indication, refer to the descriptions of the fourth indication in step S610.

Therefore, in the foregoing method 700, the DU may determine a tunnel for transmitting the network-coded redundant packet and a tunnel for transmitting the network-coded original packet, and notify the CU.

In a possible embodiment, the CU sends the network-coded packet to the DU through the tunnel based on a first proportion. For descriptions of the first proportion, refer to the foregoing descriptions. Details are not described herein.

For example, after generating the network-coded original packet and the network-coded redundant packet, a PDCP layer of the CU sends the network-coded redundant packet to the DU through the first tunnel based on the first proportion, and sends the network-coded original packet to the DU through the second tunnel. That is, the network-coded redundant packet and the network-coded original packet are split to a first RLC entity and a second RLC entity based on the first proportion.

This application further provides an embodiment. One HARQ process is introduced at a MAC layer to store a network-coded redundant packet generated by a TB of a network-coded original packet, so that the network-coded redundant packet can be obtained more conveniently. The method is applicable to both a terminal device side and an access network device side.

Figure 14:
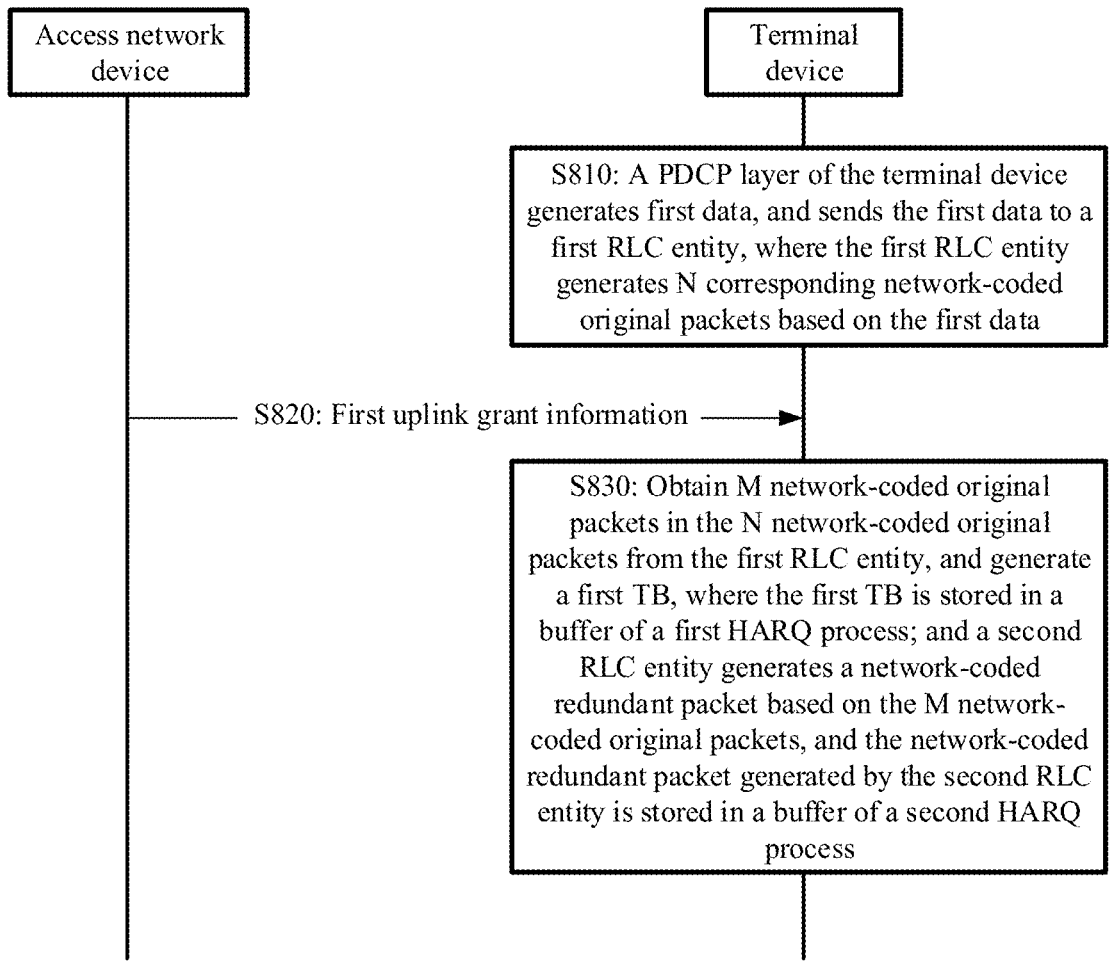
FIG. 14 is a schematic interaction diagram of a communication method according to another embodiment of this application.

FIG. 14 shows a method 800 according to another embodiment of this application. As shown in FIG. 14, the method 800 includes the following steps.

S810: A PDCP layer of a terminal device generates first data, and sends the first data to a first RLC entity, where the first RLC entity generates N corresponding network-coded original packets based on the first data, and N is a positive integer.

S820: An access network device sends first uplink grant information to the terminal device, where the first uplink grant information indicates scheduling of a first HARQ process. Correspondingly, the terminal device receives the first uplink grant information from the access network device.

S830: The terminal device obtains M network-coded original packets in the N network-coded original packets from the first RLC entity based on the first uplink grant information, and generates a first TB, where the first TB is stored in a buffer of the first HARQ process; and a second RLC entity of the terminal device generates a network-coded redundant packet based on the M network-coded original packets, the network-coded redundant packet generated by the second RLC entity is stored in a buffer of a second HARQ process, and M is a positive integer and is less than or equal to N.

The network-coded redundant packet stored in the buffer of the second HARQ process is sent after the terminal device receives second uplink grant information, the second uplink grant information is different from the first uplink grant information, and a process ID of the first HARQ process is different from a process ID of the second HARQ process.

Alternatively, the network-coded redundant packet stored in the buffer of the second HARQ process is sent based on the first uplink grant information, a sending priority of the network-coded redundant packet is lower than a sending priority of the first TB stored in the buffer of the first HARQ process, and a process ID of the first HARQ process is the same as a process ID of the second HARQ process.

The following describes an implementation of generating the network-coded redundant packet by the second RLC entity.

Optionally, the method further includes: The PDCP layer of the terminal device generates second data, and sends the second data to the second RLC entity of the terminal device, where the first data and the second data are duplicate data of each other; and that a second RLC entity generates a network-coded redundant packet based on the M network-coded original packets includes: The second RLC entity generates the network-coded redundant packet based on M network-coded original packets in the second data, where the M network-coded original packets in the second data and the M network-coded original packets in the first data are duplicate data.

In other words, the PDCP layer of the terminal device may generate two pieces of duplicate data, namely, the first data and the second data. The first data is sent to the first RLC entity, and the second data is sent to the second RLC entity. Because the M network-coded original packets in the first data and the M network-coded original packets in the second data are duplicate data, when generating the network-coded redundant packet, the second RLC entity of the terminal device may generate the network-coded redundant packet by using the M network-coded original packets in the second data.

The first RLC entity and the second RLC entity may be a same RLC entity, or may be different RLC entities. If the first RLC entity and the second RLC entity are a same RLC entity, the PDCP layer of the terminal device does not need to generate the second data, and the second RLC entity of the terminal device may generate the network-coded redundant packet by using the M network-coded original packets in the first data. That the first RLC entity and the second RLC entity are a same RLC entity may bring the following benefit: Overheads for maintaining the RLC entity on a terminal device side are reduced.

The second HARQ process may be real, or may be virtual. This is not limited in this embodiment of this application.

In a first implementation, the second HARQ process is a real HARQ process, and has a HARQ process ID. In this case, a process ID of the first HARQ process is different from a process ID of the second HARQ process.

When the process ID of the first HARQ process is different from the process ID of the second HARQ process, the method further includes: The access network device sends first configuration information to the terminal device, where the first configuration information is used to configure a relationship between the process ID of the first HARQ process and the process ID of the second HARQ process, and the network-coded redundant packet stored in the buffer of the second HARQ process indicated by the process ID of the second HARQ process is generated based on the network-coded original packet stored in the buffer of the first HARQ process indicated by the process ID of the first HARQ process. Correspondingly, the terminal device receives the first configuration information.

In other words, the access network device may configure a relationship between two HARQ processes, where one HARQ process is used to store the network-coded original packet, and the other HARQ process is used to store the network-coded redundant packet generated based on the network-coded original packet. For example, the access network device configures the process ID of the first HARQ process as a HARQ process 1 and the process ID of the second HARQ process as a HARQ process 5, where a buffer of the HARQ process 1 stores the network-coded original packet, and the network-coded redundant packet stored in a buffer of the HARQ process 5 is generated based on the network-coded original packet stored in the buffer of the HARQ process 1.

Optionally, the first configuration information includes the process ID of the first HARQ process and the process ID of the second HARQ process.

If it is determined to clear the network-coded original packet in the buffer of the first HARQ process, the network-coded redundant packet in the buffer of the second HARQ process is also correspondingly cleared. For unified descriptions herein, "clearing" may be understood as deletion, erasing, discarding, or the like. A meaning of the term is not described in detail in the following implementations related to "clearing".

If it is determined to clear the network-coded redundant packet in the buffer of the second HARQ process, the network-coded original packet in the buffer of the first HARQ process is also correspondingly cleared.

In a second implementation, the second HARQ process is a virtual HARQ process. In this case, that the second HARQ process and the first HARQ process share one process ID may be understood as sharing a buffer of one HARQ process.

When the process ID of the first HARQ process and the process ID of the second HARQ process are the same, that the first uplink grant information indicates scheduling of a first HARQ process includes: The first uplink grant information indicates an uplink grant, and the uplink grant supports sending of the network-coded original packet and the network-coded redundant packet. For example, one bit in the uplink grant information may be used to indicate that the uplink grant supports sending of the network-coded original packet and the network-coded redundant packet.

In a second implementation, the access network device may configure the terminal device to support the second HARQ process. Optionally, the method further includes: The access network device sends second configuration information to the terminal device, where the second configuration information is used to configure the second HARQ process. Correspondingly, the terminal device receives the second configuration information.

In the foregoing second implementation, the process buffer is cleared in the following possible implementation.

In a first possible implementation, if it is determined to clear the network-coded original packet in the buffer of the first HARQ process, the network-coded redundant packet in the buffer of the second HARQ process is also correspondingly cleared.

For example, an occasion for clearing the buffer of the first HARQ process is described. When the access network device schedules the first HARQ process of the terminal to perform initial transmission, the terminal device clears data in the buffer of the first HARQ process, then obtains a data packet based on scheduling information sent by the access network device, generates a transport block TB, and places the transport block TB in the first HARQ process.

In a second possible implementation, if it is determined to clear the network-coded redundant packet in the buffer of the second HARQ process, the network-coded original packet in the buffer of the first HARQ process is also correspondingly cleared.

For example, an occasion for clearing the buffer of the second HARQ process is described. When the access network device schedules the second HARQ process of the terminal to perform initial transmission, the terminal device clears data in the buffer of the second HARQ process, then obtains a data packet based on scheduling information sent by the access network device, generates a transport block TB, and places the transport block TB in the second HARQ process.

A benefit of the foregoing two implementations of "clearing the process buffer" is that, in a process of sending the network-coded redundant packet, retransmission of the network-coded original packet may be performed.

In a third possible implementation, when the network-coded redundant packet in the first HARQ process is sent, the network-coded original packet in the buffer of the second HARQ process is cleared. In comparison with the first two implementations, in the third implementation, the network-coded original packet may be cleared in advance. This helps reduce buffer overheads.

The foregoing describes an implementation of introducing one HARQ process at the MAC layer from a perspective of the terminal device side. Similarly, an access network device side may also introduce one HARQ process at the MAC layer, to store the network-coded redundant packet generated by a TB of the network-coded original packet. The following provides brief descriptions on the access network device side. For some related concepts or terms, refer to descriptions on the terminal device side.

A PDCP layer of the access network device generates first data, and sends the first data to a first RLC entity, where the first RLC entity generates N corresponding network-coded original packets based on the first data, and N is a positive integer.

The access network device obtains M network-coded original packets in the N network-coded original packets from the first RLC entity, and generates a first TB, where the first TB is stored in a buffer of the first HARQ process; and a second RLC entity of the access network device generates a network-coded redundant packet based on the M network-coded original packets, the network-coded redundant packet generated by the second RLC entity is stored in a buffer of a second HARQ process, and M is a positive integer and is less than or equal to N.

For related descriptions of the buffer of the first HARQ process and the buffer of the second HARQ process, refer to the terminal device side. For brevity, details are not described herein.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with other features based on requirements. Correspondingly, the apparatus provided in embodiments of this application may also correspondingly implement these features or functions. Details are not described herein.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application.

In correspondence to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

Figure 15:
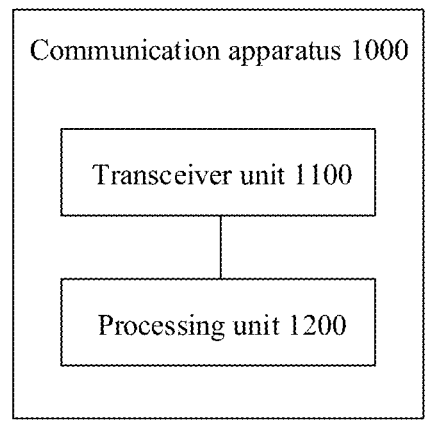
FIG. 15 is a schematic block diagram of a communication apparatus according to an embodiment of this application.

FIG. 15 is a schematic block diagram of a communication apparatus according to an embodiment of this application. As shown in FIG. 15, the communication apparatus 1000 may include a transceiver unit 1100 and a processing unit 1200.

In a possible design, the communication apparatus 1000 may correspond to the terminal device in the foregoing method embodiments, for example, may be a terminal device, or may be a chip configured in the terminal device.

The communication apparatus 1000 may correspond to the terminal device in the method 400, the terminal device in the method 500, and the terminal device in the method 800 according to embodiments of this application. The communication apparatus 1000 may include units configured to perform the method performed by the terminal device in the method 400 in FIG. 7, or include units configured to perform the method performed by the terminal device in the method 500 in FIG. 11, or include units configured to perform the method performed by the terminal device in the method 800 in FIG. 14. In addition, the units in the communication apparatus 1000 and the foregoing other operations or functions are respectively used to implement corresponding procedures of the terminal device in the method 400 in FIG. 7, corresponding procedures of the terminal device in the method 500 in FIG. 11, or corresponding procedures of the terminal device in the method 800 in FIG. 14.

In an implementation, the transceiver unit 1100 may be configured to receive first scheduling information from an access network device, where the first scheduling information indicates that a first uplink grant resource is used to support sending of a network-coded redundant packet.

The processing unit 1200 is configured to: obtain the network-coded redundant packet through a first RLC entity, and generate a first TB based on the network-coded redundant packet; and send the first TB to the access network device on the first uplink grant resource, where the first TB includes the network-coded redundant packet; and the first RLC entity is configured to transmit the network-coded redundant packet, the first RLC entity is independent of a second RLC entity, and the second RLC entity is configured to transmit a network-coded original packet.

Optionally, the first scheduling information carries a first indication, and the first indication indicates that the first uplink grant resource is used to support sending of the network-coded redundant packet.

Optionally, the transceiver unit 1100 is further configured to send the initially transmitted network-coded original packet to the access network device on the first uplink grant resource.

Optionally, a sending priority of a second logical channel associated with the second RLC entity is higher than a sending priority of a first logical channel associated with the first RLC entity, the first logical channel carries the network-coded redundant packet, and the second logical channel carries the network-coded original packet.

Optionally, the transceiver unit 1100 is further configured to receive second scheduling information from the access network device, where the second scheduling information indicates that a second uplink grant resource is used to send the network-coded original packet.

The processing unit 1200 is further configured to: obtain the network-coded original packet through the second RLC entity, and generate a second transport block TB based on the network-coded original packet.

The transceiver unit 1100 is further configured to send the second TB to the access network device on the second uplink grant resource.

Optionally, the second scheduling information carries a second indication, and the second indication indicates that the second uplink grant resource is used to send the network-coded original packet.

Optionally, the network-coded redundant packet is generated by performing network coding on the network-coded original packet.

Optionally, the transceiver unit 1100 is further configured to receive a first configuration message of a radio bearer from the access network device, where the first configuration message includes configuration information of a first RLC bearer and configuration information of a second RLC bearer.

The transceiver unit 1100 is further configured to establish the first RLC entity and the second RLC entity based on the first configuration message.

Optionally, the first configuration message further includes PDCP configuration information; and the processing unit 1200 is further configured to establish a PDCP entity based on the PDCP configuration information. The PDCP entity sends the network-coded redundant packet to the first RLC entity. The PDCP entity sends the network-coded original packet to the second RLC entity.

Optionally, the transceiver unit 1100 is further configured to receive a second configuration message of a radio bearer from the access network device, where the second configuration message includes configuration information of a first radio link control RLC bearer, configuration information of a second RLC bearer, and PDCP configuration information, the PDCP configuration information includes a first proportion, and the first proportion is a ratio of a quantity of network-coded packets transmitted by the first RLC entity to a quantity of network-coded packets transmitted by the second RLC entity.

The processing unit 1200 is further configured to establish the first RLC entity and the second RLC entity based on the second configuration message.

Alternatively, in another implementation, the transceiver unit 1100 and the processing unit 1200 may be separately configured to perform the following steps. The transceiver unit 1100 is configured to receive first scheduling information from an access network device, where the first scheduling information indicates that a first downlink resource is used to support sending of a network-coded redundant packet.

The transceiver unit 1100 is further configured to receive a first TB, where a data packet obtained through parsing the first TB is processed by a first RLC entity of the terminal device, the data packet obtained through parsing the first TB is the network-coded redundant packet, and the network-coded redundant packet is used to restore an original packet corresponding to a part of network-coded original packets.

Optionally, the first scheduling information carries a first indication, and the first indication indicates that the first downlink resource is used to support sending of the network-coded redundant packet.

Optionally, the transceiver unit 1100 is further configured to: receive second scheduling information from the access network device, where the second scheduling information indicates that a second downlink resource is used to send the network-coded original packet; and receive a second TB, where a data packet obtained through parsing the second TB is processed by a second RLC entity of the terminal device, and the data packet obtained through parsing the second TB is the network-coded original packet.

Optionally, the second scheduling information carries a second indication, and the second indication indicates that the second downlink resource is used to send the network-coded original packet.

Optionally, the processing unit 1200 is configured to: detect the second TB, and invoke, based on a detection result of the second TB, the transceiver unit 1100 to send feedback information to the access network device, where the feedback information is used to request to transmit the network-coded redundant packet.

Optionally, the transceiver unit 1100 is further configured to receive a configuration threshold from the access network device, where the configuration threshold is a threshold corresponding to one TB or a threshold corresponding to one group of TBs. The processing unit 1200 is further configured to determine the feedback information based on the configuration threshold and the detection result of the second TB.

Optionally, the configuration threshold is an error rate configuration threshold; and that the processing unit 1200 is configured to determine the feedback information based on the configuration threshold and the detection result of the second TB includes: When an error rate of the second TB is greater than or equal to the error rate configuration threshold, the feedback information includes a NACK, or includes a NACK and request information.

When an error rate of the second TB is less than the error rate configuration threshold, the feedback information includes request information, or includes an ACK and request information.

Alternatively, in another implementation, the transceiver unit 1100 is configured to receive a configuration message of a radio bearer from an access network device, where the configuration message includes configuration information of a first radio link control RLC bearer, configuration information of a second RLC bearer, and PDCP configuration information, the PDCP configuration information includes a first proportion, and the first proportion is a ratio of a first quantity of network-coded packets transmitted on the first RLC to a second quantity of network-coded packets transmitted on the second RLC.

The processing unit 1200 is configured to establish a first RLC entity and a second RLC entity based on the configuration message.

Optionally, the apparatus is a terminal device, and a PDCP entity of the terminal device sends the first quantity of network-coded packets to the first RLC entity, and sends the second quantity of network-coded packets to the second RLC entity.

The transceiver unit 1100 is further configured to send the first quantity of network-coded packets in the first RLC entity to the access network device, where a first logical channel is associated with the first RLC entity, a priority of the first logical channel is higher than a priority of a second logical channel, and the second logical channel is associated with the second RLC entity.

Optionally, the transceiver unit 1100 is further configured to send the second quantity of network-coded packets in the second RLC entity to the access network device.

Alternatively, in another implementation, the processing unit 1200 is configured to: generate first data, and send the first data to a first RLC entity, where the first RLC entity generates N corresponding network-coded original packets based on the first data, and N is a positive integer.

The transceiver unit 1100 is configured to receive first uplink grant information from an access network device, where the first uplink grant information indicates scheduling of a first HARQ process.

The processing unit 1200 is further configured to: obtain M network-coded original packets in the N network-coded original packets from the first RLC entity based on the first uplink grant information, and generate a first TB, where the first TB is stored in a buffer of the first HARQ process; and a second RLC entity of the terminal device generates a network-coded redundant packet based on the M network-coded original packets, the network-coded redundant packet generated by the second RLC entity is stored in a buffer of a second HARQ process, and M is a positive integer and is less than or equal to N.

The network-coded redundant packet stored in the buffer of the second HARQ process is sent after the terminal device receives second uplink grant information, the second uplink grant information is different from the first uplink grant information, and a process ID of the first HARQ process is different from a process ID of the second HARQ process.

Alternatively, the network-coded redundant packet stored in the buffer of the second HARQ process is sent based on the first uplink grant information, a sending priority of the network-coded redundant packet is lower than a sending priority of the first TB stored in the buffer of the first HARQ process, and a process ID of the first HARQ process is the same as a process ID of the second HARQ process.

Optionally, when the process ID of the first HARQ process is different from the process ID of the second HARQ process, the transceiver unit 1100 is further configured to: receive first configuration information from the access network device, where the first configuration information is used to configure a relationship between the process ID of the first HARQ process and the process ID of the second HARQ process, and the network-coded redundant packet stored in the buffer of the second HARQ process indicated by the process ID of the second HARQ process is generated based on the network-coded original packet stored in the buffer of the first HARQ process indicated by the process ID of the first HARQ process.

Optionally, when the process ID of the first HARQ process and the process ID of the second HARQ process are the same, that the first uplink grant information indicates scheduling of a first HARQ process includes:

The first uplink grant information indicates an uplink grant, and the uplink grant supports sending of the network-coded original packet and the network-coded redundant packet.

Optionally, the transceiver unit 1100 is further configured to receive second configuration information from the access network device, where the second configuration information is used to configure the second HARQ process.

Optionally, the first RLC entity and the second RLC entity are a same RLC entity.

Optionally, the processing unit 1200 is further configured to: generate second data, and send the second data to the second RLC entity of the terminal device, where the first data and the second data are duplicate data of each other.

That a second RLC entity generates a network-coded redundant packet based on the M network-coded original packets includes:

The second RLC entity generates the network-coded redundant packet based on M network-coded original packets in the second data, where the M network-coded original packets in the second data and the M network-coded original packets in the first data are duplicate data.

Optionally, the processing unit 1200 is further configured to: when determining to clear the network-coded original packet in the buffer of the first HARQ process, clear the network-coded redundant packet in the buffer of the second HARQ process.

It should be understood that a process in which the units perform the foregoing corresponding steps is described in detail in the foregoing method embodiments. For brevity, details are not described herein again.

Figure 16:
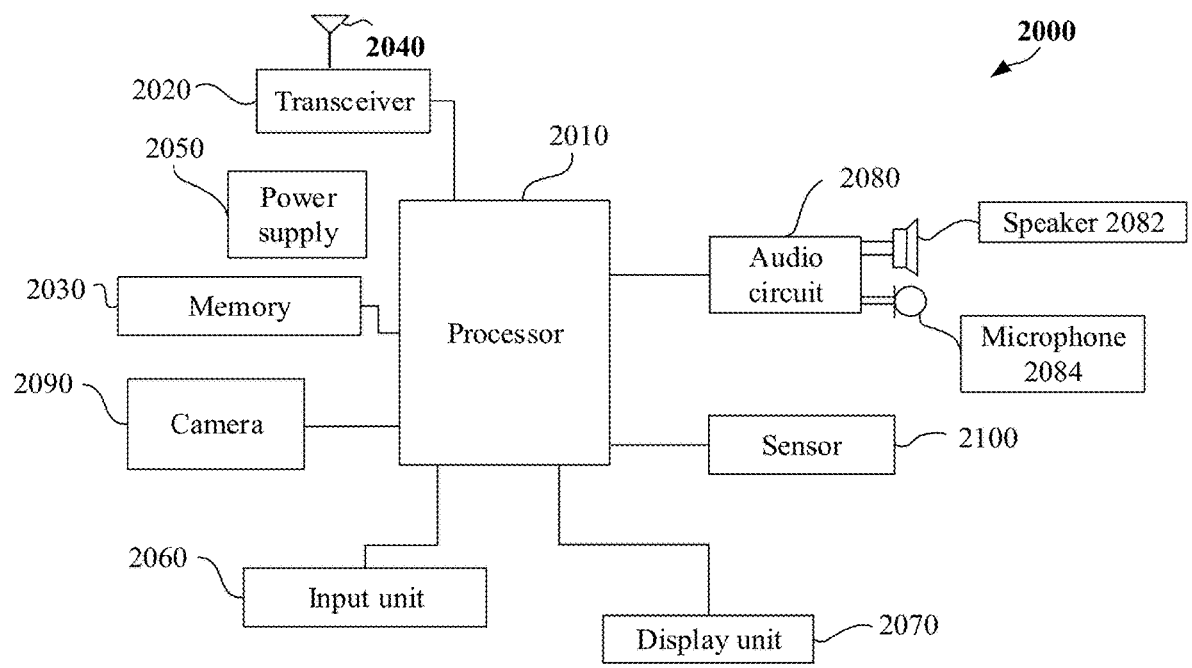
FIG. 16 is a schematic diagram of a structure of a terminal device according to an embodiment of this application.

It should be further understood that when the communication apparatus 1000 is the terminal device, the transceiver unit 1100 in the communication apparatus 1000 may correspond to a transceiver 2020 in a terminal device 2000 shown in FIG. 16. The processing unit 1200 in the communication apparatus 1000 may correspond to a processor 2010 in the terminal device 2000 shown in FIG. 16.

It should be further understood that, when the communication apparatus 1000 is the chip configured in the terminal device, the transceiver unit 1100 in the communication apparatus 1000 may be an input/output interface.

Optionally, the communication apparatus 1000 further includes a storage unit. The storage unit may be configured to store instructions or data. The processing unit may invoke the instructions or data stored in the storage unit, to implement a corresponding operation. The storage unit may be implemented through at least one memory, for example, may correspond to a memory 2030 in the terminal device 2000 in FIG. 16.

In another possible design, the communication apparatus 1000 may correspond to the access network device in the foregoing method embodiments, for example, may be an access network device or a chip configured in the access network device.

The communication apparatus 1000 may correspond to the access network device in the method 400, the access network device in the method 500, and the access network device in the method 800 according to embodiments of this application. The communication apparatus 1000 may include units configured to perform the method performed by the access network device in the method 400 in FIG. 7, or include units configured to perform the method performed by the access network device in the method 500 in FIG. 11, or include units configured to perform the method performed by the access network device in the method 800 in FIG. 14. In addition, the units in the communication apparatus 1000 and the foregoing other operations or functions are respectively used to implement corresponding procedures of the access network device in the method 400 in FIG. 7, corresponding procedures of the access network device in the method 500 in FIG. 11, or corresponding procedures of the access network device in the method 800 in FIG. 14. Alternatively, the communication apparatus may include a CU and a DU, corresponding to the method in FIG. 12 or FIG. 13.

A transceiver unit 1100 is configured to send first scheduling information to a terminal device, where the first scheduling information indicates that a first uplink grant resource is used to support sending of a network-coded redundant packet.

The transceiver unit 1100 is further configured to receive a first TB from the terminal device, where the first TB includes the network-coded redundant packet, and the first TB is generated by a first RLC entity based on the network-coded redundant packet; and the first RLC entity is configured to transmit the network-coded redundant packet, the first RLC entity is independent of a second RLC entity, and the second RLC entity is configured to transmit a network-coded original packet.

Optionally, the first scheduling information carries a first indication, and the first indication indicates that the first uplink grant resource is used to support sending of the network-coded redundant packet.

Optionally, the transceiver unit 1100 is further configured to receive the initially transmitted network-coded original packet from the terminal device.

Optionally, the transceiver unit 1100 is further configured to: send second scheduling information to the terminal device, where the second scheduling information indicates that a second uplink grant resource is used to send the network-coded original packet; and receive a second TB from the terminal device, where the second TB is generated based on the network-coded original packet.

Optionally, the second scheduling information carries a second indication, and the second indication indicates that the second uplink grant resource is used to send the network-coded original packet.

Optionally, the network-coded redundant packet is generated by performing network coding on the network-coded original packet.

Optionally, the transceiver unit 1100 is further configured to send a first configuration message of a radio bearer to the terminal device, where the first configuration message includes configuration information of a first RLC bearer and configuration information of a second RLC bearer.

Optionally, the transceiver unit 1100 is further configured to send a second configuration message of a radio bearer to the terminal device, where the second configuration message includes configuration information of a first radio link control RLC bearer, configuration information of a second RLC bearer, and PDCP configuration information, the PDCP configuration information includes a first proportion, and the first proportion is a ratio of a quantity of network-coded packets transmitted by the first RLC entity to a quantity of network-coded packets transmitted by the second RLC entity.

Optionally, the access network device includes a CU and a DU. The CU is configured to send configuration information of an uplink tunnel to the DU, where the uplink tunnel includes a first tunnel and a second tunnel, the configuration information of the uplink tunnel includes a third indication, and the third indication indicates that the first tunnel is for transmission of the network-coded redundant packet. The CU is further configured to receive configuration information of a downlink tunnel from the DU, where the configuration information of the downlink tunnel includes information corresponding to the first tunnel and information corresponding to the second tunnel.

Optionally, the configuration information of the uplink tunnel further includes a fourth indication, and the fourth indication indicates that the second tunnel is for transmission of the network-coded original packet.

Optionally, the access network device includes a central unit CU and a distributed unit DU. The CU is configured to send configuration information of an uplink tunnel to the DU, where the uplink tunnel includes a first tunnel and a second tunnel. The CU is further configured to receive configuration information of a downlink tunnel from the DU, where the configuration information of the downlink tunnel includes a fifth indication, and the fifth indication indicates that the first tunnel is for transmission of the network-coded redundant packet.

Optionally, the configuration information of the downlink tunnel further includes a sixth indication, and the sixth indication indicates that the second tunnel is for transmission of the network-coded original packet.

Alternatively, in another implementation, the transceiver unit 1100 is configured to send first scheduling information to the terminal device, where the first scheduling information indicates that a first downlink resource is used to support sending of a network-coded redundant packet.

The transceiver unit 1100 is further configured to send a first TB to the terminal device on the first downlink resource, where the first TB is generated by a first RLC entity based on the network-coded redundant packet, and the first TB includes the network-coded redundant packet; and the first RLC entity is configured to transmit the network-coded redundant packet, the first RLC entity is independent of a second RLC entity, and the second RLC entity is configured to transmit a network-coded original packet.

Optionally, the first scheduling information carries a first indication, and the first indication indicates that the first downlink resource is used to support sending of the network-coded redundant packet.

Optionally, the transceiver unit 1100 is further configured to: send second scheduling information to the terminal device, where the second scheduling information indicates that a second downlink resource is used to send the network-coded original packet; and send a second TB to the access network device on the second downlink resource, where the second TB is generated by a second RLC entity based on the network-coded original packet, and the second TB includes the network-coded original packet.

Optionally, the second scheduling information carries a second indication, and the second indication indicates that the second downlink resource is used to send the network-coded original packet.

Optionally, the transceiver unit 1100 is further configured to receive feedback information from the terminal device, where the feedback information is used to request to transmit the network-coded redundant packet.

Optionally, the transceiver unit 1100 is further configured to send a configuration threshold to the terminal device, where the configuration threshold is a threshold corresponding to one TB or a threshold corresponding to one group of TBs.

Optionally, that the transceiver unit 1100 is configured to send a first TB to a terminal device includes: when the feedback information includes a NACK, or the feedback information includes a NACK and request information, sending the first TB to the terminal device; or when the feedback information includes request information, or the feedback information includes an ACK and request information, sending the first TB to the terminal device.

Alternatively, in another implementation, the processing unit 1200 is configured to determine first uplink grant information, where the first uplink grant information indicates scheduling of a first HARQ process, a buffer of the first HARQ process is used to store a first TB, the first TB is generated based on M original network-coded packets in N original network-coded packets, and a buffer of a second HARQ process stores a network-coded redundant packet generated based on the M original network-coded packets. The transceiver unit 1100 is configured to send the first uplink grant information to the terminal device.

Optionally, when a process ID of the first HARQ process is different from a process ID of the second HARQ process, the transceiver unit 1100 is further configured to send first configuration information to the terminal device, where the first configuration information is used to configure a relationship between the process ID of the first HARQ process and the process ID of the second HARQ process; and the network-coded redundant packet stored in the buffer of the second HARQ process indicated by the process ID of the second HARQ process is generated based on the network-coded original packet stored in the buffer of the first HARQ process indicated by the process ID of the first HARQ process.

Optionally, when the process ID of the first HARQ process and the process ID of the second HARQ process are the same, that the first uplink grant information indicates scheduling of a first HARQ process includes:

The first uplink grant information indicates an uplink grant, and the uplink grant supports sending of the network-coded original packet and the network-coded redundant packet.

Optionally, the transceiver unit 1100 is further configured to send second configuration information to the terminal device, where the second configuration information is used to configure the second HARQ process.

It should be understood that a process in which the units perform the foregoing corresponding steps is described in detail in the foregoing method embodiments. For brevity, details are not described herein again.

Figure 17:
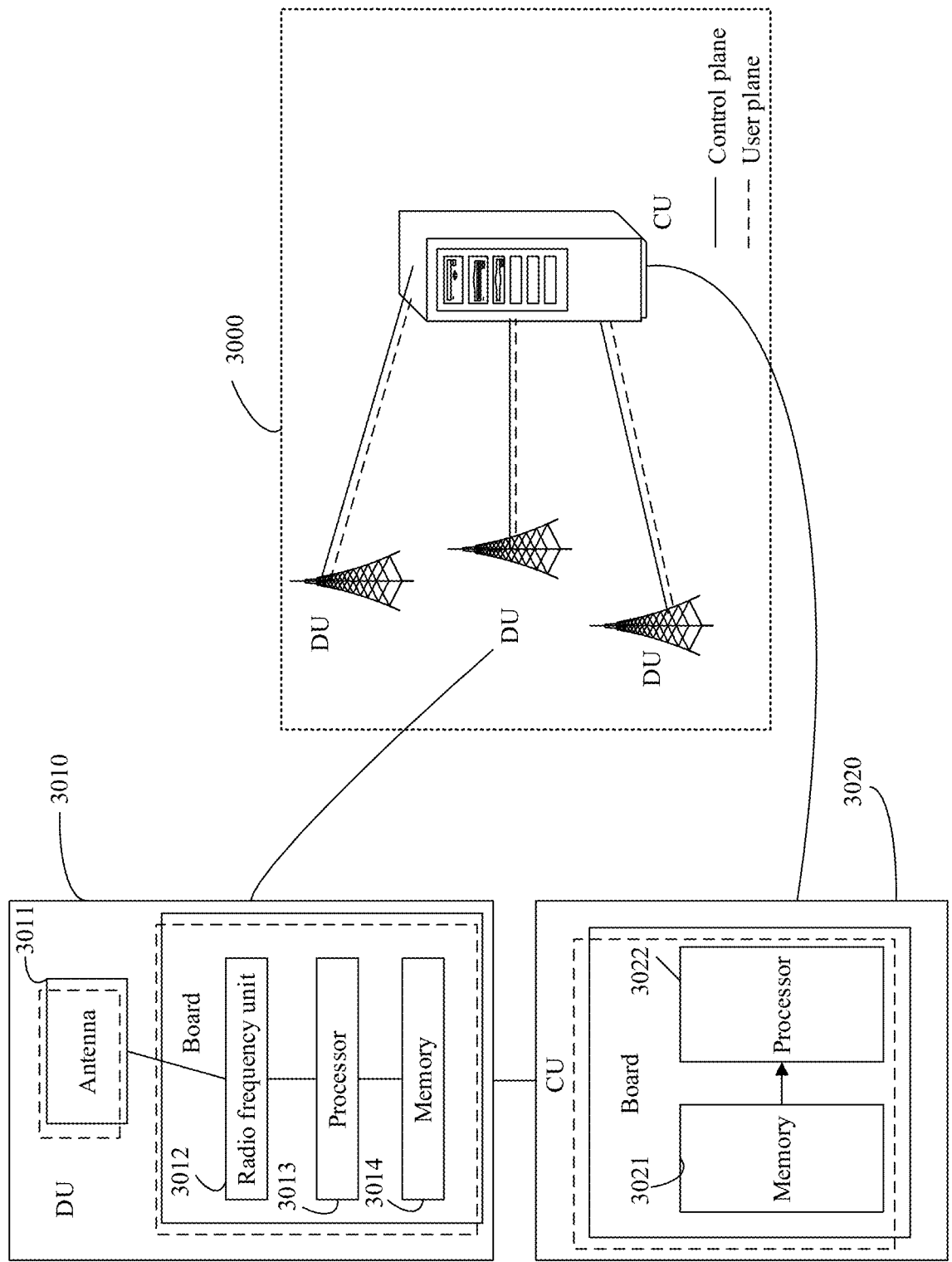
FIG. 17 is a schematic diagram of a structure of an access network device according to an embodiment of this application.

It should be further understood that when the communication apparatus 1000 is a base station, the transceiver unit 1100 in the communication apparatus 1000 may correspond to a radio frequency unit 3012 and an antenna 3011 in a network device 3000 shown in FIG. 17. The processing unit 1200 in the communication apparatus 1000 may be implemented through at least one processor, for example, may correspond to a processor 3022 in the network device 3000 shown in FIG. 17.

It should be further understood that, when the communication apparatus 1000 is the chip configured in the access network device, the transceiver unit 1100 in the communication apparatus 1000 may be an input/output interface.

Optionally, the communication apparatus 1000 further includes a storage unit. The storage unit may be configured to store instructions or data. The processing unit may invoke the instructions or data stored in the storage unit, to implement a corresponding operation. The storage unit may be implemented through at least one memory, for example, may correspond to a memory 3021 in the network device 3000 in FIG. 17.

FIG. 16 is a schematic diagram of a structure of a terminal device 2000 according to an embodiment of this application. The terminal device 2000 may be used in the system shown in FIG. 1, to perform functions of the terminal device in the foregoing method embodiments. As shown in FIG. 16, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal or a data signal. The memory 2030 is configured to store a computer program. The processor 2010 is configured to invoke the computer program from the memory 2030 and run the computer program, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030, to implement the foregoing functions. In an implementation, the memory 2030 may alternatively be integrated into the processor 2010, or may be independent of the processor 2010. The processor 2010 may correspond to the processing unit in FIG. 15.

The transceiver 2020 may correspond to the communication unit in FIG. 15, and may alternatively be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 16 can implement the processes related to the terminal device in the method embodiment shown in FIG. 7, FIG. 11, or FIG. 14. Operations or functions of the modules in the terminal device 2000 are respectively intended to implement corresponding procedures in the foregoing method embodiments. For details, refer to the descriptions in the foregoing method embodiments. To avoid repetition, detailed descriptions are appropriately omitted herein.

The processor 2010 may be configured to perform an action that is described in the foregoing method embodiments and that is implemented inside the terminal device, and the transceiver 2020 may be configured to perform a sending or receiving action, of the terminal device, that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve functions of the terminal device, the terminal device 2000 may further include one or more of the following: an input unit 2060, a display unit 2070, an audio circuit 2080, a camera 2090, a sensor 2100, and the like. The audio circuit may further include a speaker 2082, a microphone 2084, and the like.

FIG. 17 is a schematic diagram of a structure of an access network device according to an embodiment of this application, for example, may be a schematic diagram of a structure of the base station 3000. The base station 3000 may be used in the system shown in FIG. 1, FIG. 2, or FIG. 3, to perform functions of the access network device in the foregoing method embodiments. As shown in the figure, the base station 3000 may include one or more DUs 3010 and one or more CUs 3020. The CU 3020 may communicate with an NG core (NC). The DU 3010 may include at least one antenna 3011, at least one radio frequency unit 3012, at least one processor 3013, and at least one memory 3014. The DU 3010 is mainly configured to: receive or send a radio frequency signal, perform conversion between the radio frequency signal and a baseband signal, and perform partial baseband processing. The CU 3020 may include at least one processor 3022 and at least one memory 3021. The CU 3020 and the DU 3010 may communicate with each other through an interface. A control plane (CP) interface may be Fs-C, for example, F1-C, and a user plane (UP) interface may be Fs-U, for example, F1-U.

The CU 3020 is mainly configured to: perform baseband processing, control the base station, and the like. The DU 3010 and the CU 3020 may be physically disposed together, or may be physically disposed separately, namely, a distributed base station. The CU 3020 is a control center of the base station, or may be referred to as a processing unit. The CU 3020 is mainly configured to complete a baseband processing function. For example, the CU 3020 may be configured to control the base station to perform an operation procedure related to the access network device in the foregoing method embodiments.

Baseband processing on the CU and the DU may be divided based on a protocol layer of a wireless network. For example, functions of a PDCP layer and a layer above the PDCP layer are deployed on the CU, and functions of protocol layers below the PDCP layer, such as an RLC layer and a MAC layer, are deployed on the DU. For another example, the CU implements functions of an RRC layer and a PDCP layer, and the DU implements functions of an RLC layer, a MAC layer, and a PHY layer.

Optionally, the base station 3000 may include one or more radio frequency units (RUs), one or more DUs, and one or more CUs. The DU may include at least one processor 3013 and at least one memory 3014. The RU may include at least one antenna 3011 and at least one radio frequency unit 3012. The CU may include at least one processor 3022 and at least one memory 3021.

In an instance, the CU 3020 may include one or more boards, and a plurality of boards may jointly support a radio access network (for example, a 5G network) of a single access standard, or may separately support radio access networks (for example, an LTE network, a 5G network, or another network) of different access standards. The memory 3021 and the processor 3022 may serve one or more boards. In other words, a memory and a processor may be disposed on each board. Alternatively, a plurality of boards may share a same memory and a same processor. In addition, a circuit may be further disposed on each board. The DU 3010 may include one or more boards, and a plurality of boards may jointly support a radio access network (for example, a 5G network) of a single access standard, or may separately support radio access networks (for example, an LTE network, a 5G network, or another network) of different access standards. The memory 3014 and the processor 3013 may serve one or more boards. In other words, a memory and a processor may be disposed on each board. Alternatively, a plurality of boards may share a same memory and a same processor. In addition, a circuit may be further disposed on each board.

It should be understood that the base station 3000 shown in FIG. 17 can implement the processes related to the access network device in the method embodiments shown in FIG. 7 and FIG. 11 to FIG. 14. Operations and/or functions of the modules in the base station 3000 are respectively intended to implement corresponding procedures in the foregoing method embodiments. For details, refer to the descriptions in the foregoing method embodiments. To avoid repetition, detailed descriptions are appropriately omitted herein.

It should be understood that the base station 3000 shown in FIG. 17 is merely a possible architecture of the access network device, and should not constitute any limitation on this application. The method provided in this application is applicable to an access network device having another architecture, for example, an access network device including a CU, a DU, and an AAU. A specific architecture of the network device is not limited in this application.

According to the method provided in embodiments of this application, this application further provides a computer-readable storage medium. The computer-readable storage medium stores computer instructions. When the computer instructions are run on a computer, operations and/or processing performed by the terminal device in the method embodiments of this application are/is performed.

According to the method provided in embodiments of this application, this application further provides a computer-readable storage medium. The computer-readable storage medium stores computer instructions. When the computer instructions are run on a computer, operations and/or processing performed by the access network device in the method embodiments of this application are/is performed.

According to the method provided in embodiments of this application, this application further provides a computer program product. The computer program product includes computer program code or instructions. When the computer program code or the instructions are run on a computer, operations and/or processing performed by the terminal device in the method embodiments of this application are/is performed.

According to the method provided in embodiments of this application, this application further provides a computer program product. The computer program product includes computer program code or instructions. When the computer program code or the instructions are run on a computer, operations and/or processing performed by the access network device in the method embodiments of this application are/is performed.

According to the method provided in embodiments of this application, this application further provides a chip. The chip includes a processor. A memory configured to store a computer program is disposed independent of the chip. The processor is configured to execute the computer program stored in the memory, so that a terminal device in which the chip is installed performs the operations and/or processing performed by the terminal device in any method embodiment.

Further, the chip may include a communication interface. The communication interface may be an input/output interface, an interface circuit, or the like. Further, the chip may include the memory.

According to the method provided in embodiments of this application, this application further provides a chip. The chip includes a processor. A memory configured to store a computer program is disposed independent of the chip. The processor is configured to execute the computer program stored in the memory, so that an access network device in which the chip is installed performs the operations and/or processing performed by the access network device in any method embodiment.

Further, the chip may include a communication interface. The communication interface may be an input/output interface, an interface circuit, or the like. Further, the chip may include the memory.

Optionally, there may be one or more processors, and there may be one or more memories.

According to the method provided in embodiments of this application, this application further provides a communication apparatus (for example, a chip or a chip system). The communication apparatus includes a processor and a communication interface. The communication interface is configured to receive (or referred to as input) data and/or information, and transmit the received data and/or information to the processor. The processor processes the data and/or information. In addition, the communication interface is further configured to send (or referred to as output) data and/or information processed by the processor, so that operations and/or processing performed by the terminal device in any method embodiment are/is performed.

According to the method provided in embodiments of this application, this application further provides a communication apparatus (for example, a chip or a chip system). The communication apparatus includes a processor and a communication interface. The communication interface is configured to receive (or referred to as input) data and/or information, and transmit the received data and/or information to the processor. The processor processes the data and/or information. In addition, the communication interface is further configured to output (or referred to as output) data and/or information processed by the processor, so that operations and/or processing performed by the access network device in any method embodiment are/is performed.

According to the method provided in embodiments of this application, this application further provides a communication apparatus. The communication apparatus includes at least one processor. The at least one processor is coupled to at least one memory, and the at least one processor is configured to execute a computer program or instructions stored in the at least one memory, so that the communication apparatus performs the operations and/or processing performed by the terminal device in any method embodiment.

According to the method provided in embodiments of this application, this application further provides a communication apparatus. The communication apparatus includes at least one processor. The at least one processor is coupled to at least one memory, and the at least one processor is configured to execute a computer program or instructions stored in the at least one memory, so that the communication apparatus performs the operations and/or processing performed by the access network device in any method embodiment.

According to the method provided in embodiments of this application, this application further provides a communication device. The communication device includes a processor and a memory. Optionally, the communication device may further include a transceiver. The memory is configured to store a computer program. The processor is configured to: invoke the computer program stored in the memory and run the computer program, and control the transceiver to receive and send a signal, so that the communication device performs the operations and/or processing performed by the terminal device in any method embodiment.

According to the method provided in embodiments of this application, this application further provides a communication device. The communication device includes a processor and a memory. Optionally, the communication device may further include a transceiver. The memory is configured to store a computer program. The processor is configured to: invoke the computer program stored in the memory and run the computer program, and control the transceiver to receive and send a signal, so that the communication device performs the operations and/or processing performed by the access network device in any method embodiment.

According to the method provided in embodiments of this application, this application further provides a wireless communication system. The wireless communication system includes the terminal device and the access network device in embodiments of this application.

A person skilled in the art may further understand that various illustrative logical blocks and steps that are listed in embodiments of this application may be implemented by using electronic hardware, computer software, or a combination thereof. Whether the functions are implemented by hardware or software depends on particular applications and a design requirement of the entire system. A person skilled in the art may use various methods to implement the described functions for each particular application, but it should not be considered that the implementation goes beyond the scope of embodiments of this application.

It should be understood that the processor in embodiments of this application may be an integrated circuit chip, and has a signal processing capability. In an implementation process, steps in the foregoing method embodiments may be completed by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processor (DSP), a micro controller unit (MCU), a programmable logic device (PLD), or another integrated chip. It may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The technologies described in this application may be implemented in various manners. For example, these technologies may be implemented by using hardware, software, or a combination of software and hardware. For hardware implementation, a processing unit configured to perform these technologies in a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may be any conventional processor, controller, microcontroller, or state machine. The processor may alternatively be implemented by a combination of computing apparatuses, for example, a digital signal processor and a microprocessor, a plurality of microprocessors, one or more microprocessors and a digital signal processor core, or any other similar configuration.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of an example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any other proper types of memories.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a high density digital video disc (DVD)), a semiconductor medium (for example, a solid state disk (SSD)), or the like.

To describe the technical solutions in embodiments of this application, numbers such as "first" and "second" are used in embodiments of this application to distinguish between same items or similar items that provide basically same functions or purposes. For example, a first TB and a second TB are merely intended to distinguish between different TBs, and are not intended to limit a sequence thereof. A person skilled in the art may understand that the numbers such as "first" and "second" do not limit a quantity and an execution sequence, and the terms such as "first" and "second" do not indicate a definite difference.

In embodiments of this application, "at least one" means one or more, and "a plurality of" means two or more. The term "and/or" describes an association relationship between associated objects, and indicates that three relationships may exist. For example, A and/or B may indicate the following three cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural.

It should be understood that an "embodiment" mentioned throughout this specification means that particular features, structures, or characteristics related to the embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be further understood that, in this application, "when" and "if" mean that UE or a base station performs corresponding processing in an objective situation, and are not intended to limit time. The terms do not mean that the UE or the base station is required to perform a determining action during implementation, and do not mean any other limitation.

A person of ordinary skill in the art would be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It would be understood by a person skilled in the art that, for the purpose of convenient and brief description, details are not described herein again. For a detailed working process of the foregoing system, apparatuses, and units, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely some implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising at least one processing circuit, wherein the at least one processing circuit is configured to:
receive first scheduling information from an access network device, wherein the first scheduling information indicates that a first uplink grant resource is used to support sending of a network-coded redundant packet;
obtain the network-coded redundant packet through a first radio link control (RLC) entity, and generate a first transport block (TB) based on the network-coded redundant packet; and
send the first TB to the access network device on the first uplink grant resource, wherein the first TB comprises the network-coded redundant packet;
the first RLC entity is configured to transmit the network-coded redundant packet, the first RLC entity is independent of a second RLC entity, and the second RLC entity is configured to transmit a network-coded original packet; and
the network-coded redundant packet and the network-coded original packet are obtained by performing network-coding on a plurality of data packets.

2. The apparatus according to claim 1, wherein the first scheduling information carries a first indication, and the first indication indicates that the first uplink grant resource is used to support sending of the network-coded redundant packet.

3. The apparatus according to claim 1, wherein the at least one processing circuit is further configured to:
send an initially transmitted network-coded original packet to the access network device on the first uplink grant resource.

4. The apparatus according to claim 3, wherein a sending priority of a second logical channel associated with the second RLC entity is higher than a sending priority of a first logical channel associated with the first RLC entity, the first logical channel carries the network-coded redundant packet, and the second logical channel carries the network-coded original packet.

5. The apparatus according to claim 1, wherein the at least one processing circuit is further configured to:
receive second scheduling information from the access network device, wherein the second scheduling information indicates that a second uplink grant resource is used to send the network-coded original packet;
obtain the network-coded original packet through the second RLC entity, and generate a second TB based on the network-coded original packet; and
send the second TB to the access network device on the second uplink grant resource.

6. The apparatus according to claim 5, wherein
the second scheduling information carries a second indication, and the second indication indicates that the second uplink grant resource is used to send the network-coded original packet.

7. The apparatus according to claim 5, wherein the network-coded redundant packet is generated by performing network coding on the network-coded original packet.

8. The apparatus according to claim 1, wherein the at least one processing circuit is further configured to:
receive a first configuration message of a radio bearer from the access network device, wherein the first configuration message comprises configuration information of a first RLC bearer and configuration information of a second RLC bearer; and
establish the first RLC entity and the second RLC entity based on the first configuration message.

9. The apparatus according to claim 8, wherein the first configuration message further comprises packet data convergence protocol (PDCP) configuration information, and the at least one processing circuit is further configured to:
- establish a PDCP entity based on the PDCP configuration information; and
- send, by the PDCP entity, the network-coded redundant packet to the first RLC entity, and send, by the PDCP entity, the network-coded original packet to the second RLC entity.

10. The apparatus according to claim 1, wherein the at least one processing circuit is further configured to:
- receive a second configuration message of a radio bearer from the access network device, wherein the second configuration message comprises configuration information of a first RLC bearer, configuration information of a second RLC bearer, and PDCP configuration information, the PDCP configuration information comprises a first proportion, and the first proportion is a ratio of a quantity of network-coded packets transmitted by the first RLC entity to a quantity of network-coded packets transmitted by the second RLC entity; and
- establish the first RLC entity and the second RLC entity based on the second configuration message.

11. An apparatus, comprising at least one processing circuit, wherein the at least one processing circuit is configured to:
- send first scheduling information to a terminal device, wherein the first scheduling information indicates that a first uplink grant resource is used to support sending of a network-coded redundant packet; and
- receive a first transport block (TB) from the terminal device, wherein the first TB comprises the network-coded redundant packet, and the first TB is generated by a first radio link control (RLC) entity based on the network-coded redundant packet;
- the first RLC entity is configured to transmit the network-coded redundant packet, the first RLC entity is independent of a second RLC entity, and the second RLC entity is configured to transmit a network-coded original packet; and
- the network-coded redundant packet and the network-coded original packet are obtained by performing network-coding on a plurality of data packets.

12. The apparatus according to claim 11, wherein the first scheduling information carries a first indication, and the first indication indicates that the first uplink grant resource is used to support sending of the network-coded redundant packet.

13. The apparatus according to claim 11, wherein the at least one processing circuit is configured to:
- receive an initially transmitted network-coded original packet from the terminal device.

14. The apparatus according to claim 11, wherein the at least one processing circuit is configured to:
- send second scheduling information to the terminal device, wherein the second scheduling information indicates that a second uplink grant resource is used to send the network-coded original packet; and
- receive a second TB from the terminal device, wherein the second TB is generated based on the network-coded original packet.

15. The apparatus according to claim 14, wherein the second scheduling information carries a second indication, and the second indication indicates that the second uplink grant resource is used to send the network-coded original packet.

16. The apparatus according to claim 14, wherein the network-coded redundant packet is generated by performing network coding on the network-coded original packet.

17. The apparatus according to claim 11, wherein the at least one processing circuit is configured to:
- send a first configuration message of a radio bearer to the terminal device, wherein the first configuration message comprises configuration information of a first RLC bearer and configuration information of a second RLC bearer.

18. The apparatus according to claim 17, wherein the first configuration message further comprises packet data convergence protocol (PDCP) configuration information.

19. The apparatus according to claim 11, wherein the at least one processing circuit is configured to:
- send a second configuration message of a radio bearer to the terminal device, wherein the second configuration message comprises configuration information of a first RLC bearer, configuration information of a second RLC bearer, and PDCP configuration information, the PDCP configuration information comprises a first proportion, and the first proportion is a ratio of a quantity of network-coded packets transmitted by the first RLC entity to a quantity of network-coded packets transmitted by the second RLC entity.

20. A method, performed by a terminal device or by a chip for the terminal device, comprising:
- receiving first scheduling information from an access network device, wherein the first scheduling information indicates that a first uplink grant resource is used to support sending of a network-coded redundant packet;
- obtaining the network-coded redundant packet through a first radio link control (RLC) entity, and generating a first transport block (TB) based on the network-coded redundant packet; and
- sending the first TB to the access network device on the first uplink grant resource, wherein the first TB comprises the network-coded redundant packet;
- the first RLC entity is configured to transmit the network-coded redundant packet, the first RLC entity is independent of a second RLC entity, and the second RLC entity is configured to transmit a network-coded original packet; and
- the network-coded redundant packet and the network-coded original packet are obtained by performing network-coding on a plurality of data packets.

* * * * *